United States Patent
Obai

(10) Patent No.: US 7,530,648 B2
(45) Date of Patent: May 12, 2009

(54) VEHICLE BRAKE HYDRAULIC PRESSURE CONTROL APPARATUS

(75) Inventor: Katsuo Obai, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 11/431,629

(22) Filed: May 11, 2006

(65) Prior Publication Data
US 2006/0255659 A1  Nov. 16, 2006

(30) Foreign Application Priority Data
May 12, 2005   (JP)   ............... 2005-139990

(51) Int. Cl.
  *B60T 8/36*   (2006.01)
(52) U.S. Cl. ............... 303/119.1; 303/156; 303/162
(58) Field of Classification Search ............ 303/119.1, 303/3, 156, 162, 176, DIG. 1, DIG. 2
See application file for complete search history.

(56) References Cited

U.S. PATENT DOCUMENTS

| | | | | |
|---|---|---|---|---|
| 3,637,264 A | * | 1/1972 | Leiber et al. | 303/185 |
| 3,666,326 A | * | 5/1972 | Marouby | 303/156 |
| 3,833,270 A | * | 9/1974 | Gotz et al. | 303/154 |
| 5,884,986 A | * | 3/1999 | Shimizu | 303/122.12 |
| 6,290,312 B1 | * | 9/2001 | Atkins | 303/154 |
| 6,874,858 B2 | * | 4/2005 | Inagaki et al. | 303/113.1 |

FOREIGN PATENT DOCUMENTS

| | | |
|---|---|---|
| JP | 9-240451 A | 9/1997 |
| JP | 2003-019952 A | 1/2003 |

* cited by examiner

*Primary Examiner*—Xuan Lan Nguyen
(74) *Attorney, Agent, or Firm*—Buchanan Ingersoll & Rooney PC

(57) ABSTRACT

The brake hydraulic pressure control apparatus employs, as a pressure-increasing valve, a normally-open linear solenoid valve that can linearly adjust an actual differential pressure (difference between master cylinder hydraulic pressure and a wheel cylinder hydraulic pressure). This apparatus repeatedly executes, in principle, a control cycle in which a pressure-reducing control, holding control and linear pressure-increasing control make one set, while a "linear pressure-increasing control with holding period" is executed instead of the linear pressure-increasing control only in the first-time control cycle that is started in a state where a current-value-corresponding-to-actual-differential-pressure cannot correctly be obtained. The command current value Id (=I0) to the pressure-increasing valve at the point of starting the "linear pressure-increasing control with holding period" is set to a "current-value-corresponding-to-reduced-pressure" that is always smaller than the current-value-corresponding-to-actual-differential-pressure at the same point.

10 Claims, 13 Drawing Sheets

VEHICLE BRAKE HYDRAULIC PRESSURE CONTROL APPARATUS

BACKGROUND OF THE INVENTION

1. Field of the Invention:

The present invention relates to a vehicle hydraulic pressure control apparatus that executes an anti-skid control (hereinafter referred to as "ABS control") for preventing an excessive slip of a wheel.

2. Description of the Related Art:

Heretofore, a brake hydraulic pressure control apparatus that controls a brake hydraulic pressure in a wheel cylinder (hereinafter referred to as "wheel cylinder hydraulic pressure") to execute the ABS control has widely been mounted on vehicles. In general, the brake hydraulic pressure control apparatus is provided with a normally-open solenoid valve (pressure-increasing valve) disposed in a hydraulic circuit between a master cylinder generating a brake hydraulic pressure (hereinafter referred to as "master cylinder hydraulic pressure") according to a brake operation by a driver and the wheel cylinder and a normally-closed solenoid valve (pressure-reducing valve) disposed in a hydraulic circuit between the wheel cylinder and a reservoir, wherein the wheel cylinder hydraulic pressure can be reduced, held and increased by controlling the pressure-increasing valve and the pressure-reducing valve.

The ABS control is, in general, started in response to the establishment of predetermined ABS control start condition, and is accomplished by performing the pressure-increasing control after the execution of the pressure-reducing control. When the ABS control start condition is again satisfied during the pressure-increasing control in this-time ABS control, the pressure-increasing control is ended and the next ABS control is continuously started. Specifically, supposing that the period from when the ABS control start condition is satisfied to when the next ABS control start condition is satisfied is referred to as one control cycle, the ABS control is, in general, executed continuously plural times over plural-time control cycles.

Recently, there arises a demand of executing the control (hereinafter referred to as "linear pressure-increasing control") for gently (steplessly) increasing the wheel cylinder pressure during the pressure-increasing control. Therefore, in the brake hydraulic pressure control apparatus, a linear solenoid valve (in particular, normally-open linear solenoid valve) that can (steplessly) control a differential pressure (hereinafter referred to as "actual differential pressure") between the master cylinder hydraulic pressure and the wheel cylinder hydraulic pressure by linearly controlling the energizing current value has recently been employed as the pressure-increasing valve (e.g., see the following Patent Reference 1). [Patent Reference 1] Japanese Patent Application Laid-Open (kokai) No. 2003-19952.

In general, the aforesaid normally-open linear solenoid valve specifies the relationship between the energizing current value (command current) and the differential pressure (command differential pressure) corresponding to suction force by its specification. When the command differential pressure determined according to the energizing current value is greater than the actual differential pressure, the normally-open solenoid valve is closed to break the communication between the master cylinder and the wheel cylinder. On the other hand, when the command differential pressure is smaller than the actual differential pressure, the normally-open linear solenoid valve is opened to establish the communication between the master cylinder and the wheel cylinder.

As a result, the brake hydraulic pressure is flown from the master cylinder into the wheel cylinder, thereby being capable of making an adjustment such that the actual differential pressure agrees with the command differential pressure.

Accordingly, in order to execute the linear pressure-increasing control by using the normally-open solenoid valve as the pressure-increasing valve, at first, the energizing current value to the normally-open linear solenoid valve (i.e., pressure-increasing valve) is immediately set to the current value corresponding to the actual differential pressure (i.e., the energizing current value in order to match the command differential pressure with the actual differential pressure; hereinafter referred to as "current-value-corresponding-to-actual-differential-pressure") at the point of starting the linear pressure-increasing control, and the energizing current value should be linearly reduced with a constant slope after that, with the pressure-reducing valve maintained in its closed state. Accordingly, the actual differential pressure is gradually decreased after the point of starting the linear pressure-increasing control, with the result that the wheel cylinder hydraulic pressure can be gently increased over the linear pressure-increasing control.

In other words, in order to gently increase the wheel cylinder hydraulic pressure from the point of starting the linear pressure-increasing control, it is necessary to correctly obtain the current-value-corresponding-to-actual-differential-pressure (accordingly, the actual differential pressure at this point) at the point of starting the linear pressure-increasing control (or before this point). The actual differential pressure can easily be detected by using both a sensor detecting the master cylinder hydraulic pressure and a sensor detecting the wheel cylinder hydraulic pressure. However, using these two sensors is generally difficult to be adopted, since there arises a problem of increasing production cost and a problem of being difficult to secure reliability of the sensors.

From the above, it is necessary to obtain the actual differential pressure (or current-value-corresponding-to-actual-differential-pressure) at the point of starting the linear pressure-increasing control without utilizing these sensors. Therefore, the brake hydraulic pressure control apparatus disclosed in the Patent Reference 1 obtains the current-value-corresponding-to-actual-differential-pressure during the linear pressure-increasing control in the first-time control cycle (first-time ABS control), and based upon this value, obtains the current-value-corresponding-to-actual-differential-pressure at the point of starting the linear pressure-increasing control in the second-time and the following control cycles. This technique will be more specifically explained hereinafter with reference to FIGS. 13 and 14.

FIG. 13 is a time chart showing one example of a change in wheel speed Vw, (estimated) vehicle body speed Vso, master cylinder hydraulic pressure Pm, wheel cylinder hydraulic pressure Pw and command current value Id (i.e., energizing current value) to the pressure-increasing valve that is the normally-open linear solenoid valve, in case where a driver of a vehicle having mounted thereto the brake hydraulic pressure control apparatus executing the above-mentioned technique continuously executes the brake operation from a certain point before time t1 and the ABS control start condition is satisfied at time t1 and time t4 (i.e., in case where the period from time t1 to time t4 corresponds to the first-time control cycle and the period after time t4 corresponds to the second-time control cycle).

FIG. 13 shows the case in which the actual differential pressure at the point of starting the linear pressure-increasing control (time t2) becomes relatively small (such braking state is hereinafter referred to as "slow braking") since the brake operation force (accordingly, master cylinder hydraulic pressure Pm) is kept generally constant immediately after the first-time ABS control starting condition is established.

As shown in FIG. 13, this apparatus starts the pressure-reducing control (pressure-increasing valve: closed; pressure-reducing valve: opened) simultaneous with the start of the first-time ABS control at time t1, and when predetermined holding control start condition is satisfied during this pressure-reducing control, executes the holding control (pressure-increasing valve: closed; pressure-reducing valve: closed) after the pressure-reducing control. Since the pressure-increasing valve (normally-open linear solenoid valve) is kept closed during the execution of the pressure-reducing control and the execution of the holding control, the command current value Id is set to be a certain value (constant value) sufficiently greater than the current-value-corresponding-to-actual-differential-pressure.

Thereafter, since predetermined pressure-increasing control start condition is satisfied upon having reached time t2, this apparatus sets the command current value Id to an initial value at time t2 and linearly decreases the command current value Id with a constant slope in the period from time t2 to time t4, thereby executing the linear pressure-increasing control (pressure-reducing valve: closed). The initial value of the command current value Id is set, for example in the Patent Reference 2, to the current value corresponding to the pressure obtained by adding the increased amount of the master cylinder hydraulic pressure Pm during the period from the point of starting the pressure-reducing control (time t1) to the point of starting the linear pressure-increasing control (time t2) to the actual differential pressure that is increased due to the decrease in the wheel cylinder hydraulic pressure Pw during the pressure-reducing control. [Patent Reference 2] Japanese Patent Application Laid-Open (kokai) No. 9-240451.

In this example, the "slow braking" is performed in which the actual differential pressure at the point of starting the linear pressure-increasing control (time t2) is relatively small, so that the command current value Id becomes greater than the current-value-corresponding-to-actual-differential-pressure (i.e., the command differential pressure is greater than the actual differential pressure) during the period from time t2 to time t3, that means the normally-open linear solenoid valve is maintained in its closed state during the period from time t2 to time t3.

Accordingly, the wheel cylinder hydraulic pressure Pw becomes constant during this period. Upon having reached time t3, the command current value Id agrees with the current-value-corresponding-to-actual-differential-pressure, so that the normally-open linear solenoid valve is opened and the wheel cylinder hydraulic pressure Pw is increasing according to the decrease in the command current value Id during the period from time t3 to time t4. In other words, the command current value Id keeps on agreeing with the current-value-corresponding-to-actual-differential-pressure during the period from time t3 to time t4. Thus, this apparatus can correctly obtain the current-value-corresponding-to-actual-differential-pressure Idc at time t4 that is the point of ending the linear pressure-increasing control.

Subsequently, this apparatus again starts and executes the pressure-reducing control simultaneous with the start of the second-time ABS control at time t4. At this time, this apparatus obtains, by a predetermined technique, a current value (hereinafter referred to as "current-value-corresponding-to-reduced-pressure ΔIrdc) corresponding to the actual differential pressure increasing with the decrease in the wheel cylinder hydraulic pressure Pw during this pressure-reducing control. The current-value-corresponding-to-reduced-pressure ΔIrdc can be obtained, for example, as the product of the pressure-reducing control continuation time by a predetermined coefficient.

After executing the holding control after this pressure-reducing control and upon having reached time t5 that is the point when the linear pressure-increasing control start condition is satisfied, this apparatus sets the command current value Id to a value ID (ID=Idc+ΔIrdc) obtained by adding the aforesaid "current-value-corresponding-to-reduced-pressure ΔIrdc" to the aforesaid "current-value-corresponding-to-actual-differential-pressure Idc at the point of ending the linear pressure-increasing control". Here, this value ID agrees with the current-value-corresponding-to-actual-differential-pressure at time t5 (i.e., at the point of starting the linear pressure-increasing control in the second-time control cycle).

Therefore, the command current value Id keeps on correctly agreeing with the current-value-corresponding-to-actual-differential-pressure even in the linear pressure-increasing control executed after time t5, like the previous period from time t3 to time t4, with the result that the current-value-corresponding-to-actual-differential-pressure at the point of starting the linear pressure-increasing control in the third-time and the following control cycles can also be successively and correctly obtained like the aforesaid value ID.

As described above, in case where the "slow braking" is applied (more specifically, in case where the command current value Id (i.e., aforesaid initial value) at the point of starting the linear pressure-increasing control becomes greater than the current-value-corresponding-to-actual-differential-pressure), this apparatus correctly obtains the current-value-corresponding-to-actual-differential-pressure at the point of ending the linear pressure-increasing control (i.e., at the point of ending the first-time linear pressure-increasing control) by utilizing the fact that the command current value Id keeps on agreeing with the current-value-corresponding-to-actual-differential-pressure during the period from a certain point (time t3) during the linear pressure-increasing control in the first-time control cycle to the point of ending the linear pressure-increasing control, and based upon this value, this apparatus can correctly obtain the current-value-corresponding-to-actual-differential-pressure at the point of starting the linear pressure-increasing control in the second-time and the following control cycles.

However, in case where the "slow braking" described above is applied, there may arise the period (see period from time t2 to time t3 in FIG. 13) when the normally-open linear solenoid valve is kept closed (i.e., the period when the wheel cylinder hydraulic pressure Pw is held) since the command current value Id is greater than the current-value-corresponding-to-actual-differential-pressure (i.e., the command differential pressure is greater than the actual differential pressure) during the linear pressure-increasing control as described above. In other words, there may arise a problem in which the start of the pressure increase of the wheel cylinder hydraulic pressure Pw is delayed only during this period.

On the other hand, FIG. 14 is a time chart, corresponding to FIG. 13, wherein the actual differential pressure at the point of starting the linear pressure-increasing control (time t2) becomes relatively great as the brake operation force (accordingly, master cylinder hydraulic pressure Pm) increases over a relatively long period even after the first-time ABS control starting condition is established (after time t1) (this braking state is hereinafter referred to as "sudden braking"). Note that the times t1, t2, t3', t4', and t5' in FIG. 14 respectively correspond to the time t1, t2, t3, t4, and t5 in FIG. 13.

The example shown in FIG. 14 indicates the case in which the command current value Id (i.e., the aforesaid initial value) is sufficiently smaller than the current-value-corresponding-to-actual-differential-pressure (i.e., the command differential pressure is sufficiently smaller than the actual differential pressure) at time t2, since the "sudden braking" is applied in which the actual differential pressure at the point of starting the first-time linear pressure-increasing control (time t2) becomes relatively great.

In this case, after time t2, the normally-open linear solenoid valve is kept opened, so that the actual differential pressure is rapidly decreasing toward the command differential pressure according to the command current value Id (i.e., the current-value-corresponding-to-actual-differential-pressure is rapidly decreasing toward the command current value Id). Accordingly, the wheel cylinder hydraulic pressure Pw is rapidly increasing.

Then, upon having reached time t3' when the current-value-corresponding-to-actual-differential-pressure agrees with the command current value Id, the above-mentioned "rapid increase in the wheel cylinder hydraulic pressure Pw" is ended, whereby the wheel cylinder hydraulic pressure Pw increases with the decrease in the command current value Id during the period from time t3' to time t4' that is the point of ending the linear pressure-increasing control, like the period from time t3 to time t4 in FIG. 13. In other words, the command current value Id keeps on agreeing with the current-value-corresponding-to-actual-differential-pressure during the period from time t3' to time t4'. Accordingly, this apparatus can correctly obtain the current-value-corresponding-to-actual-differential-pressure Idc at the point of ending the first-time linear pressure-increasing control (time t4') (accordingly, the current-value-corresponding-to-actual-differential-pressure ID at the point of starting the second-time linear pressure-increasing control (time t5')).

As described above, even in case where the "sudden braking" is applied (more specifically, in case where the command current value Id (i.e., aforesaid initial value) at the point of starting the linear pressure-increasing control becomes smaller than the current-value-corresponding-to-actual-differential-pressure), this apparatus correctly obtains the current-value-corresponding-to-actual-differential-pressure at the point of ending the linear pressure-increasing control (i.e., at the point of ending the first-time linear pressure-increasing control) by utilizing the fact that the command current value Id keeps on agreeing with the current-value-corresponding-to-actual-differential-pressure during the period from a certain point (time t3') during the linear pressure-increasing control in the first-time control cycle to the point of ending the linear pressure-increasing control, and based upon this value, this apparatus can correctly obtain the current-value-corresponding-to-actual-differential-pressure at the point of starting the linear pressure-increasing control in the second-time and the following control cycles.

However, in case where the "sudden braking" described above is applied, there may arise a problem in which wheel cylinder hydraulic pressure Pw rapidly increases over a relatively long period caused by the command current value Id sufficiently smaller than the current-value-corresponding-to-actual-differential-pressure (i.e., the command differential pressure is sufficiently smaller than the actual differential pressure) during the linear pressure-increasing control as described above.

As understood from the above, the brake hydraulic pressure control apparatus disclosed in the Patent Reference 1 entails a problem in which the start of pressure increase of the wheel cylinder hydraulic pressure may be delayed during the linear pressure-increasing control in case where the "slow braking" is applied, and the wheel cylinder hydraulic pressure rapidly increases over a relatively long period during the linear pressure-increasing control in case where the "sudden braking" is applied.

SUMMARY OF THE INVENTION

The present invention is accomplished in view of the above-mentioned problem, and aims to provide a vehicle brake hydraulic pressure control apparatus executing an ABS control for performing a linear pressure-increasing control using a linear solenoid valve as a pressure-increasing valve, wherein, "the delay in the start of pressure increase in the wheel cylinder hydraulic pressure" when the "slow braking" is applied and the "rapid increase in the wheel cylinder hydraulic pressure over a relatively long period" when the "sudden braking" is applied, are both suppressed.

The feature of the present invention is that a brake hydraulic pressure control apparatus that is applied to a control unit provided with a pressure-increasing valve that is a linear solenoid valve and a pressure-reducing valve that can be at least opened and closed in response to an energizing current value, the apparatus comprising anti-skid control means that can continuously execute, plural times, an ABS control that is started in response to the establishment of a predetermined ABS control start condition, and in which a linear pressure-increasing control for increasing the wheel cylinder hydraulic pressure by changing the energizing current value provided to the pressure-increasing valve (a first energizing current value) with a basic pattern in which the first energizing current value linearly increases or decreases with a constant slope while the pressure-reducing valve is maintained in its closed state through the control of the energizing current value provided to the pressure-reducing valve (a second energizing current value), is executed, after a pressure-reducing control for reducing at least the wheel cylinder hydraulic pressure by controlling the first energizing current value and the second energizing current value is executed, until the next ABS control start condition is established.

The feature of the brake hydraulic pressure control apparatus according to the present invention is that the anti-skid control means sets the first energizing current value to a current value, instead of the current value corresponding to the basic pattern, for maintaining the pressure-increasing valve into its closed state over a predetermined period during the linear pressure-increasing control in the predetermined-numberth-time ABS control, thereby executing the holding control for holding the wheel cylinder hydraulic pressure over the predetermined period.

Here, as the "predetermined-numberth-time ABS control", the ABS control that is started in a state where the current-value-corresponding-to-actual-differential-pressure cannot correctly be obtained is used. In general, the current-value-corresponding-to-actual-differential-pressure cannot correctly be obtained at the point of starting the linear pressure-increasing control in the first-time ABS control. Accordingly, it is preferable that the "first-time ABS control" is used as the "predetermined-numberth-time ABS control".

The pressure-increasing valve may be normally-open solenoid valve (a linear solenoid valve that is in an open state when the energizing current value is "0") or may be normally-closed solenoid valve (a linear solenoid valve that is in a closed state when the energizing current value is "0"). Considering that the pressure-increasing valve is normally maintained in its open state, the pressure-increasing valve is preferably a normally-open solenoid valve in view of the achievement of reduction in consumption energy, enhancement of durability, or the like. In case where the normally-open linear solenoid valve is employed as the pressure-increasing valve, a pattern is used, as the basic pattern, in which the first energizing current value linearly decreases with a constant slope, while in case where the normally-closed solenoid valve is employed as the pressure-increasing valve, the pattern is used, as the basic pattern, in which the first energizing current value linearly increases with a constant slope.

The pressure-reducing valve may be a (normally-closed) solenoid on-off valve (a solenoid valve that is selectively in an open state or closed state in accordance with the energizing current value) or may be a (normally-closed) linear solenoid valve. In the ABS control, the holding control may be executed between the pressure-reducing control and the pressure-increasing control. In the ABS control, the pressure-reducing control may be executed first, or the holding control may be executed first, in response to the establishment of the ABS control start condition. The ABS control start condition that is the condition for starting each control cycle may be same for every cycle or may be different for every cycle.

Accordingly, the holding control is executed only over the predetermined period during the linear pressure-increasing control in the predetermined-numberth-time (first-time, in general) ABS control that is the ABS control at the stage where the current-value-corresponding-to-actual-differential-pressure cannot correctly be obtained. It is considered here the case where the first energizing current value at the point of starting the linear pressure-increasing control in the predetermined-numberth-time ABS control is set so as to be smaller than the current-value-corresponding-to-actual-differential-pressure at the same point when the "slow braking" is applied.

In this case, the first energizing current value at the point of starting the linear pressure-increasing control becomes smaller than the current-value-corresponding-to-actual-differential-pressure at the same point even if either one of the "slow braking" and "sudden braking" is applied. Accordingly, not only in case where the "sudden braking" is applied but also in case where the "sudden braking" is applied, the wheel cylinder hydraulic pressure can immediately increase after the point of starting the linear pressure-increasing valve. In other words, the occurrence of the "delay in the start of pressure increase of the wheel cylinder hydraulic pressure" when the "slow braking" is applied can be prevented.

In addition, supposing that the holding control is executed before the current-value-corresponding-to-actual-differential-pressure agrees with the first energizing current value (that linearly increases or decreases with a constant slope along the basic pattern) during the linear pressure-increasing control in the predetermined-numberth-time ABS control, the wheel cylinder hydraulic pressure can rapidly increase before the holding control is started as described above, but after that, the wheel cylinder hydraulic pressure can be held during the predetermined period in which the holding control is executed. Then, after the holding control is ended, the wheel cylinder hydraulic pressure can again rapidly increase (until the current-value-corresponding-to-actual-differential-pressure agrees with the first energizing current value).

This means that the average increasing slope of the wheel cylinder hydraulic pressure during the linear pressure-increasing control in the predetermined-numberth-time ABS control becomes small in case where the "sudden braking" is applied, compared to the case where the holding control is not executed (e.g., see the period from time t2 to time t3' in FIG. 14). In other words, the "rapid increase of the wheel cylinder hydraulic pressure over a relatively long period" in case where the "sudden braking" is applied can be prevented.

From the above, the first energizing current value at the point of starting the linear pressure-increasing control is set smaller than the current-value-corresponding-to-actual-differential-pressure at the same point in case where the "slow braking" is applied, by the execution of the holding control during the linear pressure-increasing control of the predetermined-numberth-time ABS control, whereby the "delay in the start of pressure increase in the wheel cylinder hydraulic pressure" in case where the "slow braking" is applied and the "rapid increase of the wheel cylinder hydraulic pressure over a relatively long period" in case where the "sudden braking" is applied can both be suppressed.

In the brake hydraulic pressure control apparatus according to the present invention, the anti-skid control means is preferably configured to set the first energizing current value at the point of starting the linear pressure-increasing control during the predetermined-numberth-time ABS control to the current value (i.e., the current-value-corresponding-to-reduced-pressure) corresponding to the differential pressure increased by the decrease in the wheel cylinder hydraulic pressure due to the pressure-reducing control in the predetermined-numberth-time ABS control.

In general, the current-value-corresponding-to-reduced-pressure by the pressure-reducing control executed before the execution of the linear pressure-increasing control becomes smaller than the current-value-corresponding-to-actual-differential-pressure at the point of starting the linear pressure-increasing control in case where the "slow braking" is applied. Therefore, with this configuration, the first energizing current value at the point of starting the linear pressure-increasing control can surely be set to the value smaller than the current-value-corresponding-to-actual-differential-pressure at the same point in case where the "slow braking" is applied. In addition, the first energizing current value at the point of starting the linear pressure-increasing control can be set smaller than the energizing current value set in the aforesaid Patent Reference 2 (="current-value-corresponding-to-reduced-pressure"+"current value corresponding to the increasing amount of the master cylinder hydraulic pressure from the point of starting the pressure-reducing control to the point of starting the linear pressure-increasing control"), so that the first energizing current value at the point of starting the linear pressure-increasing control can more surely be set to the value smaller than the current-value-corresponding-to-actual-differential-pressure at the same point in case where the "slow braking" is applied, compared to the aforesaid Patent Reference 2.

In the brake hydraulic pressure control apparatus according to the present invention, the anti-skid control means is preferably configured to set the first energizing current value in the execution of the holding control in the linear pressure-increasing control in the predetermined-numberth-time ABS control to the current value obtained by adding or subtracting a fixed value to or from the current value corresponding to the basic pattern.

Here, in case where the normally-open linear solenoid valve is used as the pressure-increasing valve, the first energizing current value during the execution of the holding control is set to the current value obtained by adding the fixed value to the current value corresponding to the basic pattern, while in case where the normally-closed linear solenoid valve is used as the pressure-increasing valve, the first energizing current value during the execution of the holding control is set to the current value obtained by subtracting the fixed value from the current value corresponding to the basic pattern.

The first energizing current value provided to the linear solenoid valve, which is the pressure-increasing valve, can be changed with a simple pattern from the basic pattern, whereby the holding control can be executed during the execution of the linear pressure-increasing control in the predetermined-numberth-time ABS control.

Further, in the brake hydraulic pressure control apparatus according to the present invention, the anti-skid control means is preferably configured to periodically execute the holding control during the linear pressure-increasing control in the predetermined-numberth-time ABS control.

With this configuration, the pressure-increasing control and the holding control are alternately and periodically executed during the execution of the pressure-increasing control in the predetermined-numberth-time ABS control. Accordingly, the average increasing slope of the wheel cylinder hydraulic pressure during the linear pressure-increasing control in the predetermined-numberth-time ABS control can be made more uniform over the linear pressure-increasing control. As a result, more stable and gentle pressure-increasing control can be achieved during the predetermined-numberth-time ABS control.

In case where the holding control is periodically executed during the linear pressure-increasing control in the predetermined-numberth-time ABS control in this manner, the brake hydraulic pressure control apparatus according to the present invention is preferably configured to further include holding control time changing means that obtains, during the linear pressure-increasing control in the predetermined-numberth-time ABS control, the value indicating the degree of the increase in the slip amount for the wheel to which the ABS control is to be performed, and changes, in accordance with the value indicating the degree of the increase in the slip amount for the wheel, the length of the predetermined period in which the holding control is executed.

Here, the value indicating the degree of the increase in the slip amount for the wheel is, for example, the degree in which the slip amount for "the wheel to which the ABS control is to be performed" at the point of starting the respective pressure-increasing controls periodically executed during the linear pressure-increasing control in the predetermined-numberth-time ABS control increases. More specifically, it is the difference between the slip amount for the wheel at the point of starting the pressure-increasing control this time and the slip amount for the wheel at the point of starting the pressure-increasing control last time (the first one before the this-time pressure-increasing control). But it is not limited thereto.

In general, a predetermined optimum value is present in the increasing slope of the wheel cylinder hydraulic pressure during the (linear) pressure-increasing control in the ABS control. Here, the (average) increasing slope of the wheel cylinder hydraulic pressure during the linear pressure-increasing control in the predetermined-numberth-time ABS control can be adjusted by changing the length of the predetermined period in which each of the periodically executed holding controls is executed.

On the other hand, as the increasing slope of the wheel cylinder hydraulic pressure during the (linear) pressure-increasing control in the ABS control increases, the degree of the increase in the slip amount for the "wheel to which the ABS control is to be performed" during the pressure-increasing control increases, in general. In other words, the value indicating the degree of the increase in the slip amount for the wheel during the linear pressure-increasing control in the ABS control can be the value precisely indicating the increasing slope of the wheel cylinder hydraulic pressure.

From the above, the configuration in which the length of the predetermined period in which each of the periodically executed holding controls is executed is changed in accordance with the value indicating the degree of the increase in the slip amount for the wheel makes it possible to match the increasing slope of the wheel cylinder hydraulic pressure with the predetermined optimum value (or to make the increasing slope of the wheel cylinder hydraulic pressure close to the predetermined optimum value) by prolonging the predetermined period, in case, for example, the degree of the increase in the slip amount for the wheel is great (i.e., in case where the increasing slope of the wheel cylinder hydraulic pressure is great). Consequently, the optimum linear pressure-increasing control based upon the optimum increasing slope of the wheel cylinder hydraulic pressure can be executed during the predetermined-numberth-time ABS control.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
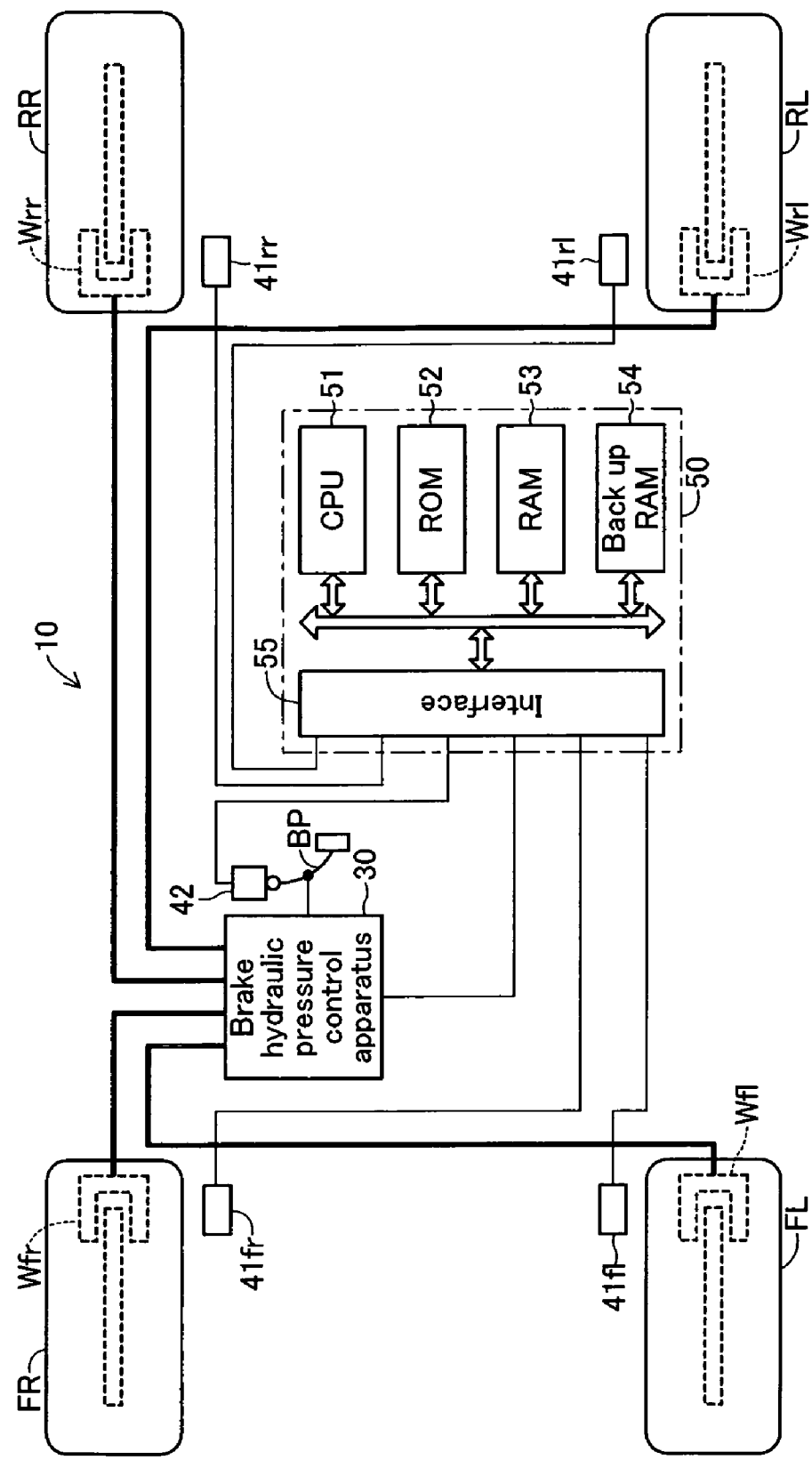
FIG. 1 is a schematic diagram of a vehicle equipped with a vehicle motion control apparatus including a brake hydraulic pressure control apparatus according to an embodiment of the present invention.

An embodiment of the present invention will be described with reference to the drawings. FIG. 1 schematically shows the structure of a vehicle equipped with a vehicle motion control apparatus 10 including a brake hydraulic pressure control apparatus according to the present embodiment. The illustrated vehicle is a four-wheel, rear-wheel drive (FR) vehicle having two front wheels (a front left wheel FL and a front right wheel FR), which are non-drive wheels (follower wheels), and two rear wheels (a rear left wheel RL and a rear right wheel RR), which are drive wheels.

Figure 2:
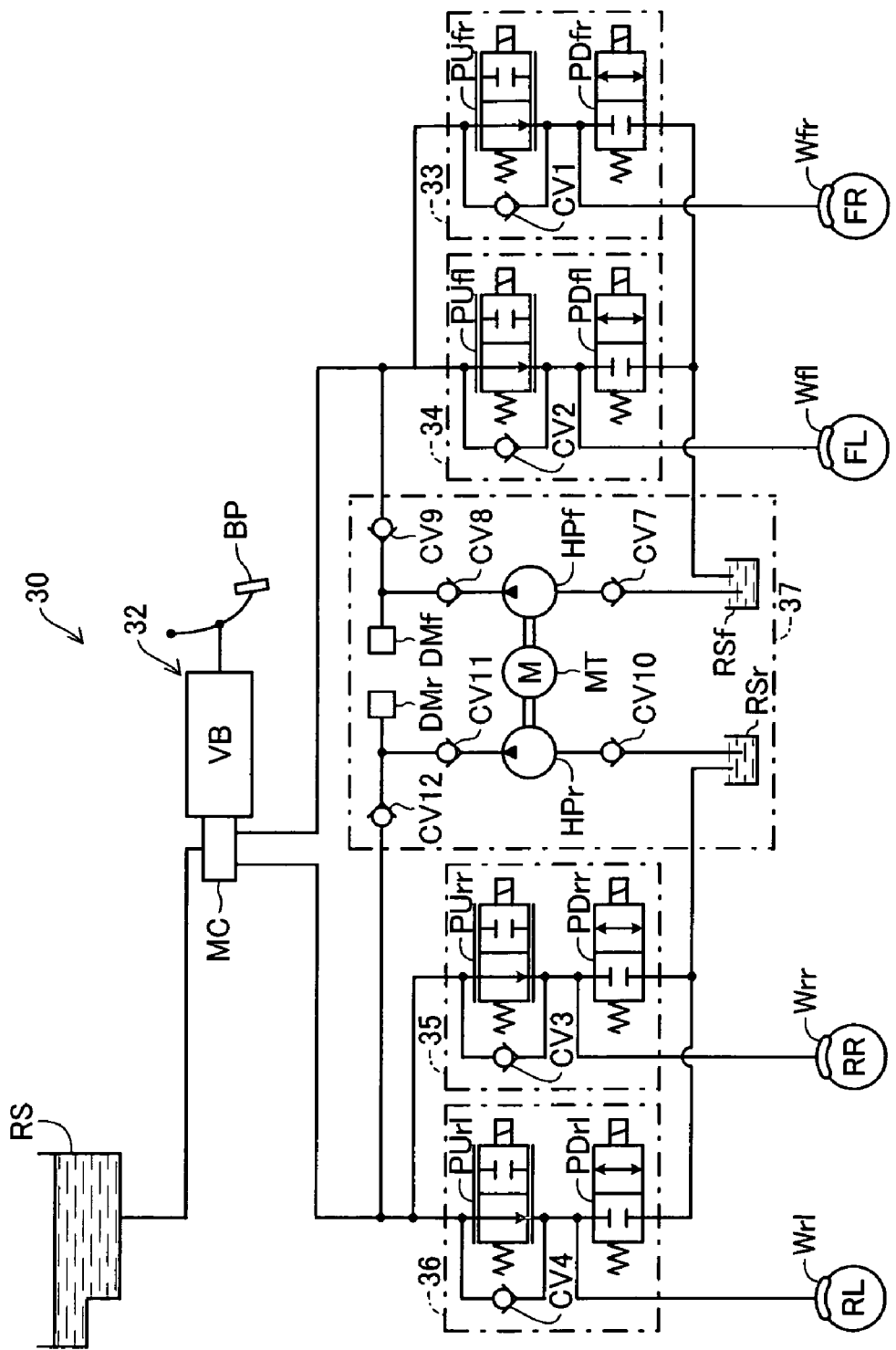
FIG. 2 is a schematic diagram of a brake hydraulic pressure control apparatus shown in FIG. 1.

This vehicle motion control apparatus 10 includes a brake hydraulic pressure control section 30 for generating braking force in each wheel by means of brake hydraulic pressure. As schematically shown in FIG. 2, the brake hydraulic pressure control section 30 includes a brake hydraulic pressure generating section 32 which generates brake hydraulic pressure corresponding to the operating force of a brake pedal BP; an FR brake hydraulic pressure adjusting section 33, an FL brake hydraulic pressure adjusting section 34, an RR brake hydraulic pressure adjusting section 35, and an RL brake hydraulic pressure adjusting section 36, which can adjust the brake hydraulic pressures supplied to corresponding wheel cylinders Wfr, Wfl, Wrr, and Wrl respectively installed on the wheels FR, FL, RR, and RL; and a return brake fluid supply section 37.

The brake hydraulic pressure generating section 32 includes a vacuum booster VB which operates in response to operation of the brake pedal BP, and a master cylinder MC which is linked to the vacuum booster VB. The vacuum booster VB utilizes the pressure (negative pressure) of air within an intake pipe of an unillustrated engine so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure corresponding to the boosted operating force. The master cylinder MC also generates from the second port a second master cylinder hydraulic pressure which is substantially the same as the first master cylinder hydraulic pressure and which corresponds to the boosted operating force. The structures and operations of the master cylinder MC and the vacuum booster VB are well known, and therefore an explanation of the details thereof will be omitted. In this manner, the master cylinder MC and the vacuum booster VB (brake hydraulic pressure generating means) generate first and second master cylinder hydraulic pressures corresponding to the operating force of the brake pedal BP.

The first port of the master cylinder MC is connected to the upstream side of the FR brake hydraulic pressure adjusting section 33 and the upstream side of the FL brake hydraulic pressure adjusting section 34. Similarly, the second port of the master cylinder MC is connected to the upstream side of the RR brake hydraulic pressure adjusting section 35 and the upstream side of the RL brake hydraulic pressure adjusting section 36. Thus, the first master cylinder hydraulic pressure is supplied to the upstream side of the FR brake hydraulic pressure adjusting section 33 and the upstream side of the FL brake hydraulic pressure adjusting section 34, and the second master cylinder hydraulic pressure is supplied to the upstream side of the RR brake hydraulic pressure adjusting section 35 and the upstream side of the RL brake hydraulic pressure adjusting section 36.

The FR brake hydraulic pressure adjusting section 33 consists of a pressure-increasing valve PUfr (corresponding to the "first valve"), which is a normally-open linear solenoid valve, and a pressure-reducing valve PDfr (corresponding to the "second valve"), which is a normally-closed solenoid on-off valve of a 2-port, 2-position type. The pressure-reducing valve PDfr is opened and closed in accordance with an energizing current value provided to the pressure-reducing valve PDfr (corresponding to the "second energizing current value"). When the pressure-reducing valve PDfr is in its closed state (in a position in a non-excited (OFF) state) as shown in FIG. 2, it breaks the communication between the wheel cylinder Wfr and the reservoir RSf, while when it is in its open state (in a position in an excited (ON) state), it establishes communication between the wheel cylinder Wfr and the reservoir RSf.

Force in the open direction based upon the urging force from an unillustrated coil spring is normally exerted on the valve body of the pressure-increasing valve PUfr, and force in the open direction based upon the differential pressure between the master cylinder hydraulic pressure and the wheel cylinder hydraulic pressure (hereinafter simply referred sometimes to as "actual differential pressure") and force in the closing direction based upon suction force that proportionally increases in accordance with an energizing current value (accordingly, command current value Id) provided to the pressure-increasing valve PUfr (corresponding to the "first energizing current value") are exerted on the valve body of the pressure-increasing valve PUfr.

Figure 3:
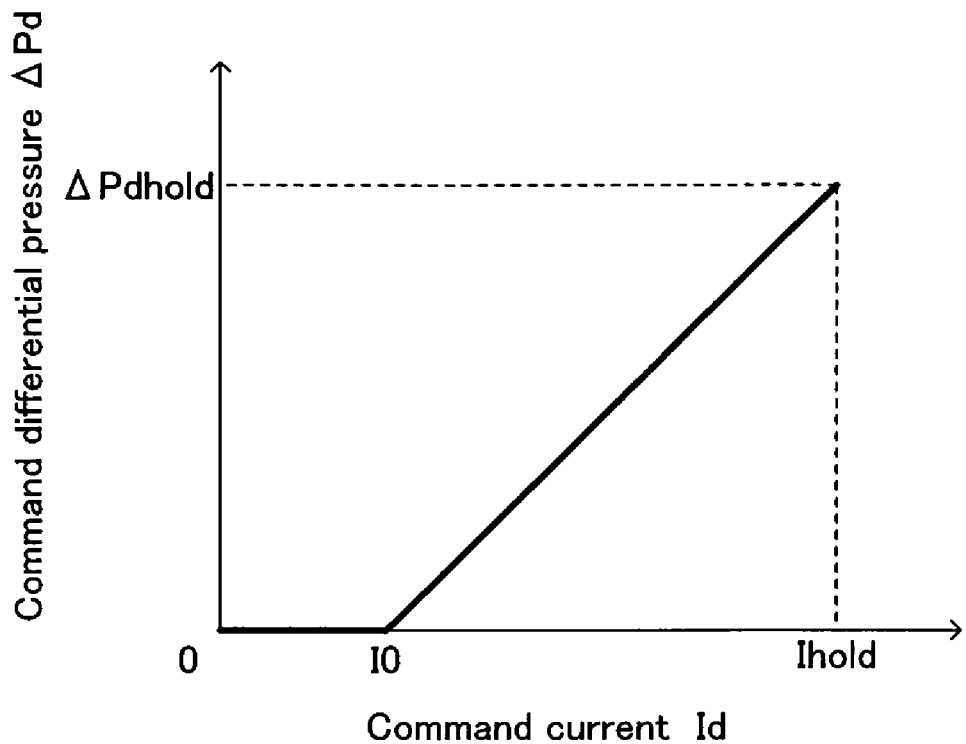
FIG. 3 is a graph showing a relationship between a command current and command differential pressure for the pressure-increasing valve shown in FIG. 2.
Figure 4:
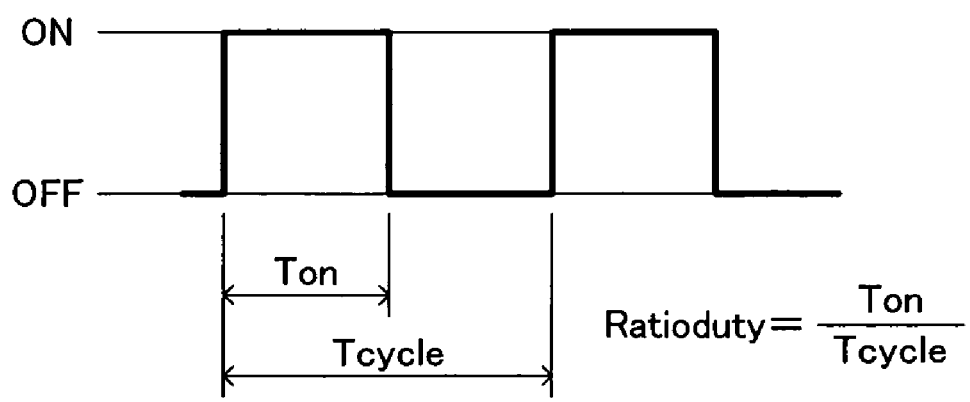
FIG. 4 is a view showing an energizing pattern upon controlling the command current shown in FIG. 3 with a duty control.

As a result, it is determined such that the command differential pressure ΔPd corresponding to the suction force is proportionally increased in accordance with the command current value Id as shown in FIG. 3. Here, I0 is a current value corresponding to the urging force of the coil spring. When the command differential pressure ΔPd is greater than the actual differential pressure (i.e., when the command current value Id is greater than the current-value-corresponding-to-actual-differential-pressure), the pressure-increasing valve PUfr is closed to break the communication between the upstream side of the FR brake hydraulic pressure adjusting section 33 and the wheel cylinder Wfr. On the other hand, when the command differential pressure ΔPd is smaller than the actual differential pressure (i.e., when the command current value Id is smaller than the current-value-corresponding-to-actual-differential-pressure), the pressure-increasing valve PUfr is opened to establish communication between the upstream side of the FR brake hydraulic pressure adjusting section 33 and the wheel cylinder Wfr. As a result, the brake hydraulic pressure at the upstream side of the FR brake hydraulic pressure adjusting section 33 flows into the wheel cylinder Wfr, whereby the actual differential pressure can be adjusted to agree with the command differential pressure ΔPd.

Specifically, the actual differential pressure (its allowable maximum value) can be controlled in accordance with the command current value Id to the pressure-increasing valve PUfr. Further, when the pressure-increasing valve PUfr is brought into the non-exited state (i.e., when the command current value Id is set to "0"), the pressure-increasing valve PUfr holds its open state by the urging force of the coil spring. Moreover, the command current value Id is set to a value (closed-valve holding current value Ihold, see FIG. 3) corresponding to the command differential pressure ΔPd that is sufficiently greater than the differential pressure that can be generated as the actual differential pressure, whereby the pressure-increasing valve PUfr holds its closed state.

Thus, when the command current value Id to the pressure-increasing valve PUfr is gradually decreased from the current-value-corresponding-to-actual-differential-pressure at this point with the pressure-reducing valve PDfr closed, the actual differential pressure gradually decreases, with the result that the brake hydraulic pressure in the wheel cylinder Wfr (wheel cylinder hydraulic pressure) gently increases. The operation in this case is referred to as linear pressure-increasing mode.

Further, when the pressure-reducing valve PDfr is closed with the pressure-increasing valve PUfr kept closed, regardless of the hydraulic pressure in the upstream side of the FR brake hydraulic pressure adjusting section 33, the wheel cylinder hydraulic pressure at the time of changeover is maintained. The operation in this case is referred to as holding mode. Further, when the pressure-increasing valve is kept to be closed and the pressure-reducing valve PDfr is opened, the brake hydraulic pressure in the wheel cylinder Wfr is returned to the reservoir RSf, thereby reducing the wheel cylinder hydraulic pressure. The operation in this case is referred to as pressure-reducing mode.

In this manner, in principle, the brake hydraulic pressure in the wheel cylinder Wfr (wheel cylinder hydraulic pressure) can be linear-increased, held or decreased according to three types of modes such as the linear pressure-increasing mode, holding mode and pressure-reducing mode. It should be noted that a "linear pressure-increasing control with holding period" in which the pressure-increasing control and the holding control are alternately and periodically executed may be executed as described later.

A check valve CV1 which allows flow of the brake fluid in only one direction from the wheel cylinder Wfr side to the upstream side of the FR brake hydraulic pressure adjusting section 33 is connected in parallel with the pressure-increasing valve PUfr. As a result, when the brake pedal BP is released after being operated, the brake hydraulic pressure in the wheel cylinder Wfr is rapidly decreased.

Similarly, the FL brake hydraulic pressure adjusting section 34, the RR brake hydraulic pressure adjusting section 35, and the RL brake hydraulic pressure adjusting section 36 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively. By controlling each pressure-increasing valve (normally-open linear solenoid valve) and pressure-reducing valve (normally-closed solenoid on-off valve), the brake hydraulic pressure in the wheel cylinder Wfl, the wheel cylinder Wrr, and the wheel cylinder Wrl can be linear-increased (including the linear pressure-increasing control with the holding period), held, or decreased. Check valves CV2, CV3, and CV4 are provided in parallel with the pressure-increasing valves PUfl, PUrr, and PUrl, respectively, to provide the same function as that of the check valve CV1.

The return brake fluid supply section 37 includes a DC motor MT, and two hydraulic pumps HPf and HPr simultaneously driven by the motor MT. The hydraulic pump HPf pumps, via a check valve CV7, the brake fluid returned from the pressure reducing values PDfr and PDfl to the reservoir RSf, and supplies the pumped brake fluid to the upstream sides of the FR brake hydraulic pressure adjusting section 33 and the FL brake hydraulic pressure adjusting section 34 via check valves CV8 and CV9.

Similarly, the hydraulic pump HPr pumps, via a check valve CV10, the brake fluid returned from the pressure reducing valves PDrr and PDrl to the reservoir RSr, and supplies the pumped brake fluid to the upstream sides of the RR brake hydraulic pressure adjusting section 35 and the RL brake hydraulic pressure adjusting section 36 via check valves CV11 and CV12. Notably, in order to reduce pulsations of discharge pressures of the hydraulic pumps HPf and HPr, dampers DMf and DMr are disposed in a hydraulic circuit between the check valves CV8 and CV9 and a hydraulic circuit between the check valves CV11 and CV12, respectively.

The motor MT (accordingly, the hydraulic pumps HPf and HPr) is, in principle, driven with a predetermined revolution speed during only when at least one of the pressure-reducing valves PDfr, PDfl, PDrr and PDrl is closed (i.e., when the pressure-reducing mode is selected for at least one wheel).

With the structure described above, when all the solenoid valves are in their non-excited positions, the brake hydraulic pressure control section 30 supplies to each wheel cylinder a brake hydraulic pressure corresponding to the operating force of the brake pedal BP (i.e., master cylinder hydraulic pressure). In this state, it becomes possible to decrease only the brake hydraulic pressure in, for example, the wheel cylinder Wrr from the (second) master cylinder hydraulic pressure by a prescribed amount through control of the pressure-increasing valve PUrr and the pressure-reducing valve PDrr. That is, the brake hydraulic pressure control section 30 can individually decrease the wheel cylinder hydraulic pressure of each wheel from the master cylinder hydraulic pressure.

Referring back to FIG. 1, the vehicle motion control apparatus 10 includes wheel speed sensors 41FL, 41FR, 41RL, and 41RR, each of which outputs a signal having a pulse each time the corresponding wheel rotates by a prescribed angle; a brake switch 42 that is brought into on-state (High signal) or off-state (Low signal) according to whether the brake pedal BP is operated or not; and an electronic controller 50.

The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to the wheel speed sensors 41 and the brake switch 42. The interface 55 supplies signals from the wheel speed sensors 41** and the brake switch 42 to the CPU 51. Further, in accordance with instructions from the CPU 51, the interface 55 transmits a driving signal to the solenoid valves (pressure-increasing valve PU and pressure-reducing valve PD) and the motor MT of the brake hydraulic pressure control section 30**.

In the following description, the symbol "" appended to various variables and the like collectively represents the symbols fl, fr, rl, and rr and indicates that the particular variable or the like applies to all of the wheels FR, FL, etc. of the vehicle. For example, the pressure-increasing valve PU collectively indicates the pressure-increasing valve PUfl for the front left wheel, the pressure-increasing valve PUfr for the front right wheel, the pressure-increasing valve PUrl for the rear left wheel, and the pressure-increasing valve PUrr for the rear right wheel.

Thus, the above-mentioned command current value Id (energizing current value) to the pressure-increasing valve PU is controlled by the CPU 51. Specifically, the CPU 51 adjusts the ratio of the energizing time Ton to the pressure-increasing valve PU to one cycle time Tcycle (i.e., duty ratio Ratioduty=Ton/Tcycle), thereby adjusting the average (effective) current (=the command current value Id). As a result, the command current value Id can be individually variably controlled so as to be linear for every wheel by individually adjusting the duty ratio Ratioduty** for every wheel (i.e., duty control).

The brake hydraulic pressure control section 30 (CPU 51) explained above executes an ABS control in order that a slip of the wheel caused by the operation on the brake pedal BP by a driver does not become excessive. The ABS control is the control of properly decreasing the wheel cylinder hydraulic pressure for a specific wheel from the master cylinder hydraulic pressure by the control of decreasing, holding or increasing the wheel cylinder hydraulic pressure for the specific wheel, when the specific wheel tends to slip (rock).

Outline of ABS Control

Next, there will be described an outline of the ABS control performed by the vehicle motion control apparatus 10 (hereinafter may be referred to as "present apparatus") including the brake hydraulic pressure control apparatus according to the present embodiment. The present apparatus starts the ABS control in response to the establishment of predetermined ABS control start condition. In this ABS control in principle, the pressure-reducing control is started and executed simultaneously with the establishment of the ABS control start condition, and the holding control is started and executed after the pressure-reducing control when predetermined holding control start condition is satisfied during this pressure-reducing control. Further, when predetermined pressure-increasing control start condition is satisfied during the holding control, the linear pressure-increasing control is executed after the holding control.

When the ABS control start condition is again satisfied during the linear pressure-increasing control in this-time ABS control, the linear pressure-increasing control is ended and the next-time ABS control is continuously started. Specifically, supposing that the period from the point when the ABS control start condition is satisfied to the next point when the ABS control start condition is satisfied is defined as one control cycle, the present apparatus, in principle, continuously executes the ABS control, in which the pressure-reducing control, holding control and linear pressure-increasing control make one set, plural times over control cycles of plural times until predetermined ABS control ending condition is satisfied.

On the other hand, the present apparatus executes a "linear pressure-increasing control with holding period" described later, instead of the linear pressure-increasing control, only at the first-time ABS control that is started with a state in which the current-value-corresponding-to-actual-differential-pressure cannot correctly be obtained. The ABS control by the present apparatus will be more specifically explained hereinafter with reference to FIGS. 5 to 7.

Figure 5:
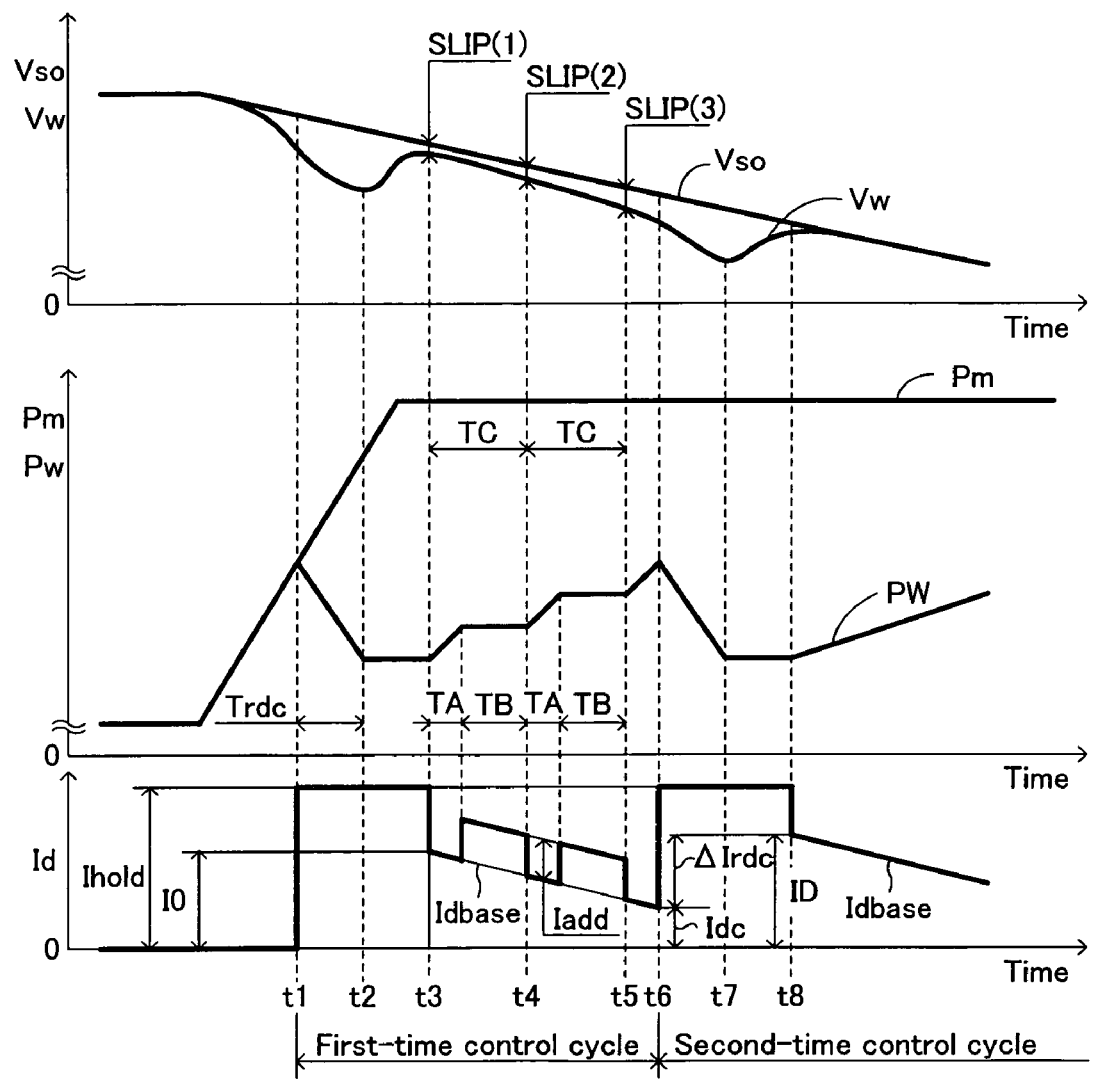
FIG. 5 is a first-half section of a time chart showing one example of a change in estimated vehicle body speed, wheel speed, master cylinder hydraulic pressure, wheel cylinder hydraulic pressure and command current value to the pressure-increasing valve that is the normally-open linear solenoid valve, in case where the ABS control is executed by the brake hydraulic pressure control apparatus shown in FIG. 1 since the "slow braking" is applied by a driver.
Figure 6:
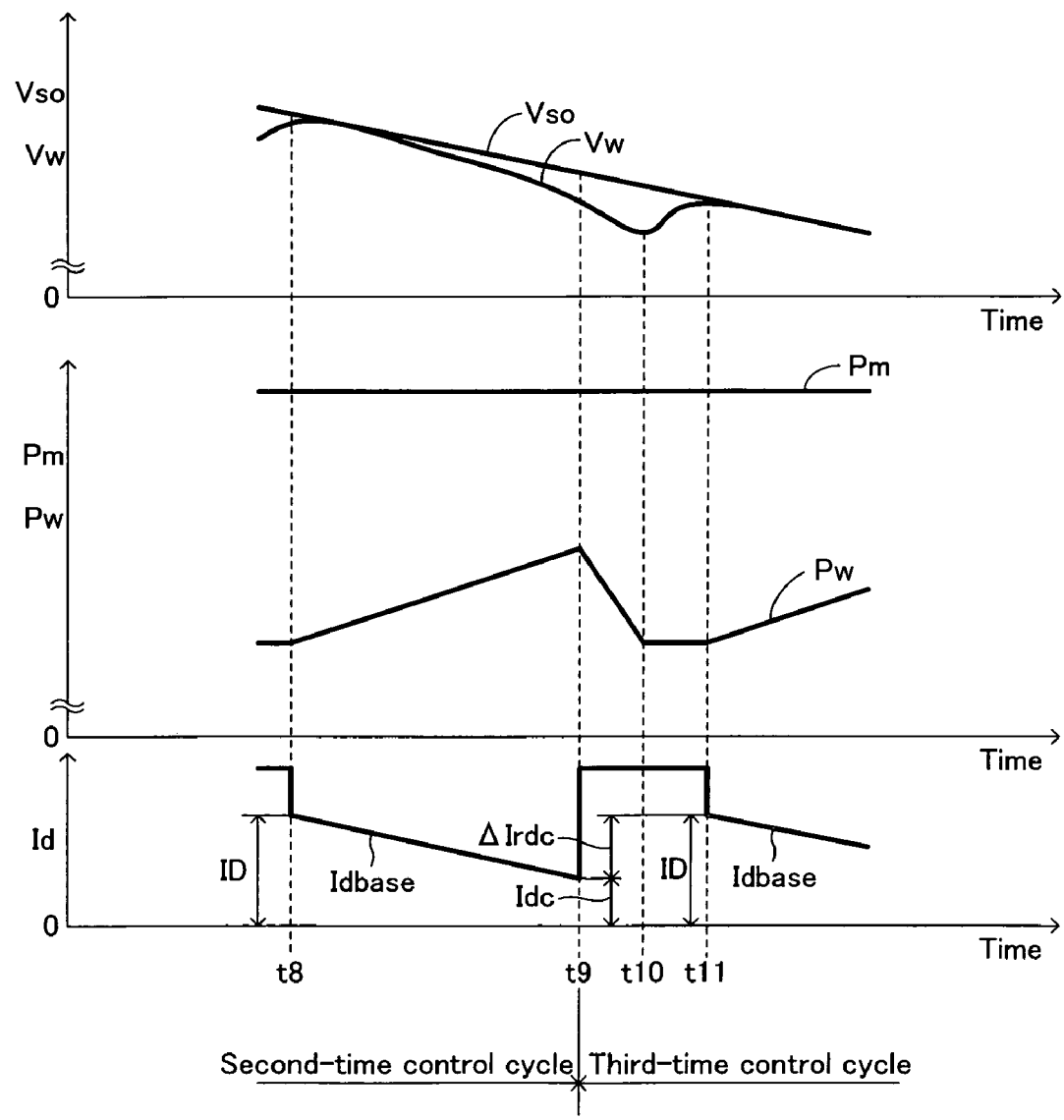
FIG. 6 is a second-half section of a time chart showing one example of a change in estimated vehicle body speed, wheel speed, master cylinder hydraulic pressure, wheel cylinder hydraulic pressure and command current value to the pressure-increasing valve that is the normally-open linear solenoid valve, in case where the ABS control is executed by the brake hydraulic pressure control apparatus shown in FIG. 1 since the "sudden braking" is applied by a driver.

FIG. 5 and FIG. 6 are respectively a first-half section and a second-half section of a series of time chart showing one example of a change in (estimated) vehicle body speed Vso, wheel speed Vw, master cylinder hydraulic pressure Pm, wheel cylinder hydraulic pressure Pw and command current value Id (i.e., energizing current value) to the pressure-increasing valve PU that is the linear solenoid valve, when a driver applies "sudden braking" from a certain point before time t1** and the ABS control is therefore executed by this apparatus.

FIG. 5 and FIG. 6 show the case where the master cylinder hydraulic pressure Pm rapidly starts to increase from the point of starting the "sudden braking", keeps on increasing over a relatively long period of time even after the first-time ABS control start condition is satisfied at the time t1 and is kept to be a constant value after that.

In this case, since the ABS control is not executed before time t1, the wheel cylinder hydraulic pressure Pw becomes equal to the master cylinder hydraulic pressure Pm as shown in FIG. 5. Upon having reached time t1, the ABS control start condition is satisfied, so that the present apparatus starts the pressure-reducing control (pressure-increasing valve PU: closed (command current value: Ihold), pressure-reducing valve PD: open). As a result, the first-time control cycle is started and the wheel cylinder hydraulic pressure Pw starts to decrease. The ABS control start conditions in this example are "SLIP>SLIPref, and |DVw|>DVwref".

Here, SLIP is a slip amount for the wheel. The slip amount SLIP is represented by the following equation (1). In the equation (1), Vso is an estimated vehicle body speed. In this example, it is the greatest value of the wheel speeds Vw for each wheel. DVw is a wheel acceleration (i.e., time-differentiated value of wheel speed Vw) for the wheel**. SLIPref and DVwref are respectively predetermined constants.

$$SLIP^{}=V_{SO}-Vw^{} \quad (1)$$

Subsequently, upon having reached time t2, the holding control start condition is satisfied, so that the present apparatus starts the holding control (pressure-increasing valve PU: closed (command current value: Ihold), pressure-reducing valve PD: closed) after the pressure-reducing control. As a result, the wheel cylinder hydraulic pressure Pw is kept to be a constant value after time t2. The holding control start condition in this example is that "DVw** is changed to a positive value from a negative value".

Upon having reached time t3, the pressure-increasing control start condition is satisfied, so that the present apparatus executes the "linear pressure-increasing control with holding period" instead of the linear pressure-increasing control only for the present control cycle, as described above. The pressure-increasing control start condition in this example is "SLIP**<SLIPref1". SLIPref1 is a predetermined constant. Subsequently explained is the "linear pressure-increasing control with holding period".

At first, the present apparatus obtains the current value (hereinafter referred to as "current-value-corresponding-to-reduced-pressure ΔIrdc") corresponding to the actual differential pressure that is increased with the decrease in the wheel cylinder hydraulic pressure Pw during the aforesaid pressure-reducing control (period from time t1 to time t2). In the following equation (2), Trdc is a continuation time of the pressure-reducing control (in this case, the period from time t1 to time t2), and Krdc is a predetermined coefficient. Note that ΔIrdc may be set to a predetermined fixed value.

Here, the current-value-corresponding-to-reduced-pressure ΔIrdc is smaller than the current-value-corresponding-to-actual-differential-pressure at the point of starting the linear pressure-increasing control with holding period (in this case, time t3) not only in case where the "sudden braking" is applied but also in case where the "slow braking" is applied. In other words, in case where the "sudden braking" shown in FIGS. 5 and 6 is applied, the current-value-corresponding-to-reduced-pressure ΔIrdc becomes sufficiently smaller than the current-value-corresponding-to-actual-differential-pressure at the point of starting the linear pressure-increasing control with holding period.

$$\Delta Irdc = Krdc \cdot Trdc \qquad (2)$$

Further, the present apparatus sets a basic pattern of the command current value Id in which "the initial value I0 (the value at time t3) of the command current value Id is set as the above-mentioned obtained current-value-corresponding-to-reduced-pressure ΔIrdc, and after that, the command current value Id linearly decreases with a constant slope in accordance with an elapse of time". It should be noted that the aforesaid "constant slope" is set to the value corresponding to the optimum increasing slope of the wheel cylinder hydraulic pressure Pw. After that, the current value corresponding to the basic pattern is referred to as "basic current value Idbase".

The present apparatus firstly sets and changes the command current value Id in accordance with the basic pattern (i.e., to the basic current value itself) over a predetermined pressure-increasing time TA after time t3 with the pressure-reducing valve PD** maintained in its closed state. The current-value-corresponding-to-reduced-pressure ΔIrdc (=initial value I0 of the command current value Id) is sufficiently smaller than the current-value-corresponding-to-actual-differential-pressure at time t3. In addition, the command current value Id gradually decreases during the pressure-increasing time TA. Accordingly, the wheel cylinder hydraulic pressure Pw always increases during the pressure-increasing time TA. The increase in the wheel cylinder hydraulic pressure Pw during the pressure-increasing time TA will be explained later in detail.

Then, the present apparatus sets and changes the command current value Id to the value "Idbase+Iadd" that is obtained by adding a predetermined addition value Iadd to the basic current value IdBase over a predetermined holding time TB with the pressure-reducing valve PD maintained in its closed state. The addition value Iadd is set to the current-value-corresponding-to-actual-differential-pressure corresponding to the supposed greatest value of the actual differential pressure during the ABS control (in particular, at the point of starting the linear pressure-increasing control). In other words, since the command current value Id is always greater than the current-value-corresponding-to-actual-differential-pressure during the holding time TB in which the command current value Id is set to "Idbase+Iadd", the pressure-increasing valve PU is maintained in its closed state. Specifically, the value "Idbase+Iadd" corresponds to "current value for maintaining the pressure-increasing valve in its closed state".

As a result, the holding control is executed during the holding time TB, so that the wheel cylinder hydraulic pressure Pw is kept to be constant during the holding time TB. The control for alternately executing the pressure-increasing control and the holding control, in which the time TC (=TA+TB) that is the sum of the pressure-increasing time TA and the holding time TB makes one pulse period, is referred to as a "cycle control".

The present apparatus successively and repeatedly executes the cycle control until the previous ABS control start conditions are again satisfied (accordingly, until the second-time control cycle is started). In the example shown in FIG. 5, the present apparatus starts the second-time cycle control at time t4 when one pulse cycle TC has been elapsed from time t3. Further, the present apparatus starts the third-time cycle control at time t5 when one pulse cycle TC has been elapsed from time t4.

Upon having reached time t6 that is the point before the pressure-increasing time TA of the third-time cycle control has been elapsed, the ABS control start conditions are again satisfied, so that the present apparatus stops the third-time cycle control that is currently being executed (i.e., the "linear pressure-increasing control with holding period" is stopped).

Subsequently explained is the increase in the wheel cylinder hydraulic pressure Pw during the pressure-increasing time TA (each of the three pressure-increasing times TA in the example shown in FIG. 5). As described above, the command current value Id at the point of starting the "linear pressure-increasing control with holding period" (time t3) is sufficiently smaller than the current-value-corresponding-to-actual-differential-pressure at the same point. Accordingly, the wheel cylinder hydraulic pressure Pw rapidly increases until the current-value-corresponding-to-actual-differential-pressure agrees with the command current value Id (=basic current value Idbase) corresponding to the aforesaid basic pattern, during the execution of the pressure-increasing control (during the pressure-increasing time TA) during the "linear pressure-increasing control with holding period".

On the other hand, the current-value-corresponding-to-actual-differential-pressure keeps on agreeing with the command current value Id (=basic current value Idbase) after the point when the current-value-corresponding-to-actual-differential-pressure agrees with the basic current value Idbase during any one of the pressure-increasing times TA, and consequently, the wheel cylinder hydraulic pressure Pw gently increases with optimum increasing slope.

Setting each pressure-increasing time TA rather small can prevent that the rapid increase in the wheel cylinder hydraulic pressure Pw arises over a relatively long period. In addition, the wheel cylinder hydraulic pressure Pw is held during each holding time TB. This means that the average increasing slope of the wheel cylinder hydraulic pressure Pw during the "linear pressure-increasing control with holding period" can be decreased in case where the "sudden braking" is applied. Specifically, each pressure-increasing time TA is set rather small and the holding time TB is set, whereby the occurrence of the above-mentioned "rapid increase in the wheel cylinder hydraulic pressure over a relatively long period" in case where the "sudden braking" is applied can be prevented.

When the "linear pressure-increasing control with holding period" is stopped at time t6 in FIG. 5, the first-time control cycle is ended and the second-time control cycle (second-time ABS control) is started at time t6. At this time, the command value Id at time t6 agreeing with the current-value-corresponding-to-actual-differential-pressure at time t6 is stored as the current-value-corresponding-to-actual-differential-pressure at the point of starting pressure-reducing control Idc.

Subsequently, the present apparatus executes the pressure-reducing control from the period from time t6 to time t7 when the holding control starting condition is established, and obtains at time t7 the current-value-corresponding-to-reduced-pressure ΔIrdc for the pressure-reducing control during the period from time t6 to time t7 in accordance with the aforesaid equation (2).

Subsequently, the present apparatus executes again the holding control during the period from time t7 to time t8 that is the point when the pressure-increasing control start condition is satisfied, and at time t8 (i.e., at the point of starting the second-time linear pressure-increasing control), sets the command current value Id to the value ID (ID=Idc+ΔIrdc) obtained by adding the current-value-corresponding-to-reduced-pressure ΔIrdc to the current-value-corresponding-to-actual-differential-pressure Idc at the point of starting the pressure-reducing control. According to this, the command current value Id at time t8 agrees with the current-value-corresponding-to-actual-differential-pressure at the same point.

In order to execute the linear pressure-increasing control, the present apparatus sets the basic pattern of the command current value Id, after time t8, in which "the initial value (the value at time t8) of the command current value Id is made to the aforesaid obtained value ID, and the command current value Id linearly reduces with the aforesaid "constant slope" in accordance with the elapse of time".

Then, the present apparatus sets and changes the command current value Id along the basic pattern (i.e., to the basic current value Idbase itself) in accordance with the elapse of time after time t8 with the pressure-reducing valve PD** maintained in its closed state. Accordingly, the wheel cylinder hydraulic pressure Pw gently increases with an optimum predetermined increasing slope after time t8 as shown in FIGS. 5 and 6. Specifically, the linear pressure-increasing control is executed. During this control, the command current value Id keeps on agreeing with the current-value-corresponding-to-actual-differential-pressure.

Upon having reached time t9, the ABS control start condition is again established, so that the present apparatus stops the linear pressure-increasing control that is currently being executed. With this, the second-time control cycle is ended and the third-time control cycle (third-time ABS control) is started. Even in the third-time ABS control (the same is true for the fourth and the following ABS controls), the command current value Id is set to the newly calculated value ID (=Idc+ΔIrdc) at the point of starting the linear pressure-increasing control (time t11), like the second-time ABS control, and after time t11, the command current value Id is set and changed along the basic pattern that is newly set so as to make the "newly calculated value ID" to the initial value, whereby the linear pressure-increasing control is executed.

In this manner, so long as the ABS control ending condition is not satisfied, the present apparatus executes the ABS control in which the pressure-reducing control, holding control and linear pressure-increasing control with holding period make one set only in the first-time ABS control that is started in a state where the current-value-corresponding-to-actual-differential-pressure can not correctly be obtained, and after the second-time ABS control that is started in a state where the current-value-corresponding-to-actual-differential-pressure can correctly be obtained, repeatedly executes the ABS control in which the pressure-reducing control, holding control and linear pressure-increasing control make one set.

As a result, in case where the "sudden braking" is applied as shown in FIGS. 5 and 6, the occurrence of the above-mentioned "rapid increase in the wheel cylinder hydraulic pressure over a relatively long period" can be prevented during the "linear pressure-increasing control with holding period" in the first-time ABS control.

Figure 7:
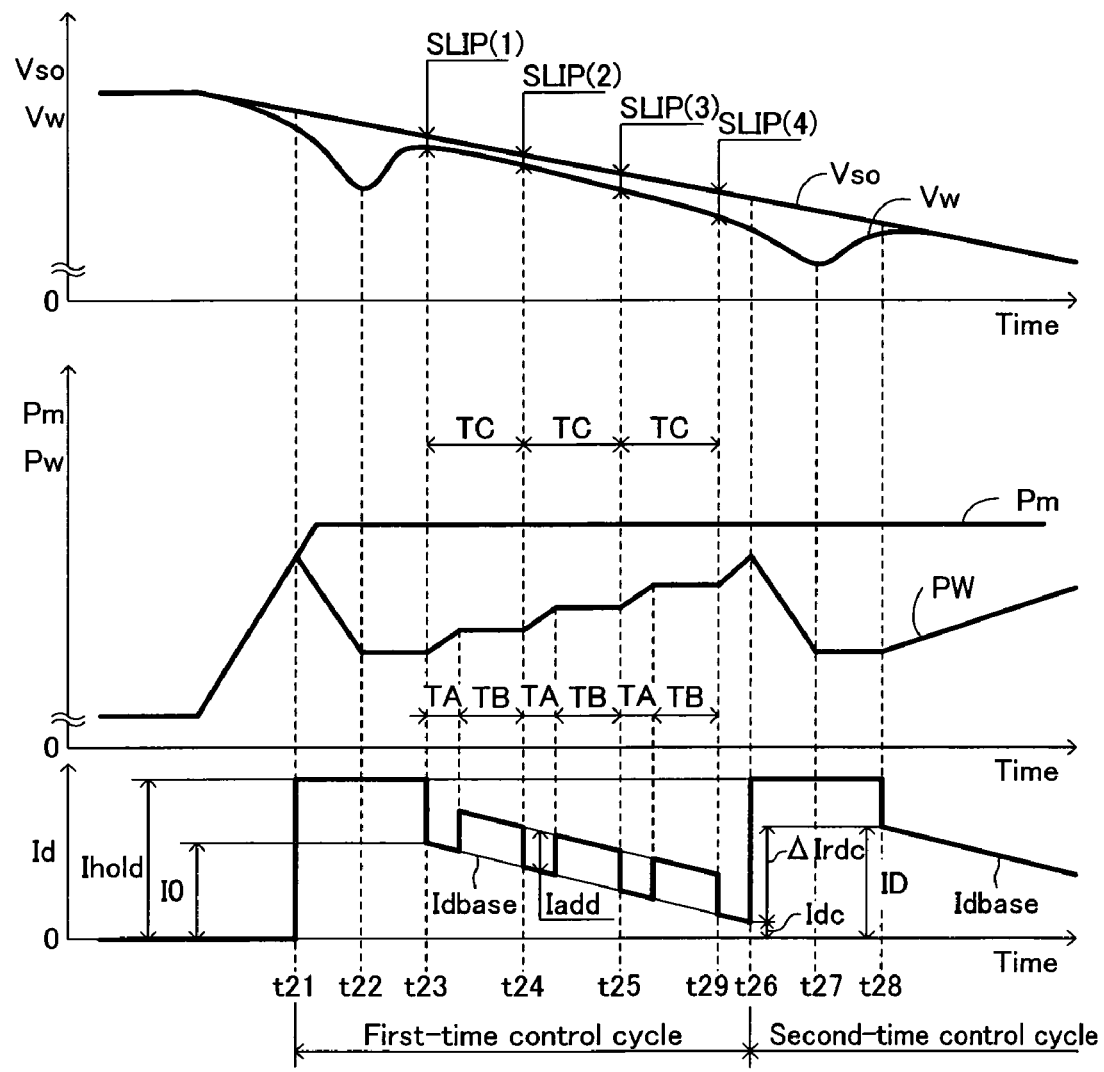
FIG. 7 is a time chart showing one example of a change in estimated vehicle body speed, wheel speed, master cylinder hydraulic pressure, wheel cylinder hydraulic pressure and command current value to the pressure-increasing valve that is the normally-open linear solenoid valve, in case where the ABS control is executed by the brake hydraulic pressure control apparatus shown in FIG. 1 since the "slow braking" is applied by a driver.

On the other hand, FIG. 7 is a time chart, corresponding to FIG. 5, in case where the present apparatus executes the ABS control since a driver applies the "slow braking" from a certain point before time t21. The times t21, t22, t23, t24, t25, t26, t27 and t28 in FIG. 7 respectively correspond to the times t1, t2, t3, t4, t5, t6, t7 and t8 in FIG. 5.

As described above, even in case where the "slow braking" is applied, the command current value Id (=I0, specifically, the current-value-corresponding-to-reduced-pressure ΔIrdc for the pressure-reducing control during the period from time t21 to time 22) at the point of starting the "linear pressure-increasing control with holding period" (time t23) in the first-time ABS control is always smaller than the current-value-corresponding-to-actual-differential-pressure at time t23. In addition, the command current value Id gradually decreases along the basic pattern during the pressure-increasing time TA as described above.

Accordingly, as shown in FIG. 7, the wheel cylinder hydraulic pressure Pw immediately increases from time t23 that is the point of starting the first-time pressure-increasing time TA (i.e., the point of starting the "linear pressure-increasing control with holding period") during the "linear pressure-increasing control with holding period". Specifically, the command current value Id at the point of starting the "linear pressure-increasing control with holding period" is set to the current-value-corresponding-to-reduced-pressure ΔIrdc that is always smaller than the current-value-corresponding-to-actual-differential-pressure at the same point, whereby the aforesaid "delay in the start of pressure increase of the wheel cylinder hydraulic pressure" when the "slow braking" is applied can be prevented.

In case where the "sudden braking" shown in FIG. 5 is applied, the second-time ABS control is started during the third-time "cycle control" (time t6) during the "linear pressure-increasing control with holding period", while in case where the "slow braking" shown in FIG. 7 is applied, the second-time ABS control is started during the fourth-time "cycle control" (time t26) during the "linear pressure-increasing control with holding period". In other words, in case where the "slow braking" is applied, the continuation time of the "linear pressure-increasing control with holding period" prolongs, compared to the case where the "sudden braking" is applied. This is based upon the following reason.

Specifically, in case where the "slow braking" is applied, the difference between the command current value Id at the point of starting the "linear pressure-increasing control with holding period" and the current-value-corresponding-to-actual-differential-pressure at the same point becomes small, compared to the case where the "sudden braking" is applied. Therefore, the increasing slope of the wheel cylinder hydraulic pressure Pw (that rapidly increases) becomes small until the current-value-corresponding-to-actual-differential-pressure agrees with the command current value Id (=basic current value Idbase) during the execution of the pressure-increasing control (during the pressure-increasing time TA) in the "linear pressure-increasing control with holding period".

As a result, each of the increasing amounts of the wheel cylinder hydraulic pressure Pw by each pressure-increasing control executed until the current-value-corresponding-toactual-differential-pressure agrees with the command current value Id (=basic current value Idbase) decreases. This leads to the increase in the number of times of the aforesaid "cycle control" periodically executed during the "linear pressure-increasing control with holding period". Accordingly, in case where the "slow braking" is applied, the continuation time of the "linear pressure-increasing control with holding period" prolongs, compared to the case where the "sudden braking" is applied.

As described above, the present apparatus executes, in the ABS control, the "linear pressure-increasing control with holding period" in the first-time ABS control started in a state where the current-value-corresponding-to-actual-differential-pressure cannot correctly be obtained, thereby being capable of suppressing both the aforesaid "rapid increase in the wheel cylinder hydraulic pressure over a relatively long period" when the "sudden braking" is applied and the aforesaid "delay in the start of the pressure increase in the wheel cylinder hydraulic pressure" when the "slow braking" is applied. The above is the outline of the ABS control.

Change of Holding Time TB During Linear Pressure-Increasing Control with Holding Period A predetermined optimum value is present at the increasing slope of the wheel cylinder hydraulic pressure Pw during the pressure-increasing control in the ABS control. As described previously, the wheel cylinder hydraulic pressure Pw is controlled so as to gently increase with the optimum predetermined increasing slope during the liner pressure-increasing control executed in the second-time and the following ABS controls.

Meanwhile, the average increasing slope of the wheel cylinder hydraulic pressure Pw during the "linear pressure-increasing control with holding period" (see the period from time t3 to time t6 in FIG. 5 and the period from time t23 to time t26 in FIG. 7) executed in the first-time ABS control can be adjusted by changing the length of the holding time TB.

On the other hand, the extremely great increase in the average increasing slope of the wheel cylinder hydraulic pressure Pw during the "linear pressure-increasing control with holding period" can be detected by detecting the high tendency of the increase in the slip amount SLIP** for the wheels during the "linear pressure-increasing control with holding period".

In view of this, the present apparatus successively obtains the slip amounts of the wheels (see SLIP(1), SLIP(2) and SLIP(3) in FIG. 5, SLIP(1), SLIP(2), SLIP(3) and SLIP (4) in FIG. 7) at the respective points (see times t3, t4 and t5 in FIG. 5, or times t23, t24, t25 and t29 in FIG. 7) when the pressure-increasing control is started (accordingly, the cycle control is started) during the "linear pressure-increasing control with holding period".

When the value obtained by subtracting the slip amount SLIP(k−1) at the point of starting the pressure-increasing control obtained last time from the slip amount SLIP(k) at the point of starting the pressure-increasing control obtained this time is greater than the predetermined value ΔSLIPref, the present apparatus determines that the increasing slope of the wheel cylinder hydraulic pressure Pw during the "linear pressure-increasing control with holding period" becomes extremely great, whereby it sets the holding time TB of the holding control executed successive to the pressure-increasing control this time rather long (actually, it sets the cycle TC in the cycle control this time to "TC+ΔTC(>0)". ΔTC is an extension time). The above is the outline of the change in the holding time in the "linear pressure-increasing control with holding period".

Actual Operation

The actual operation of the vehicle motion control apparatus 10, which includes the brake hydraulic pressure control apparatus according to the embodiment of the present invention having the above-described structure, will be explained while referring to FIGS. 8 to 12, which show, in the form of flowcharts, routines which are executed by the CPU 51 of the electronic controller 50. Each routine shown in FIGS. 8 to 12 is executed for every wheel.

Figure 8:
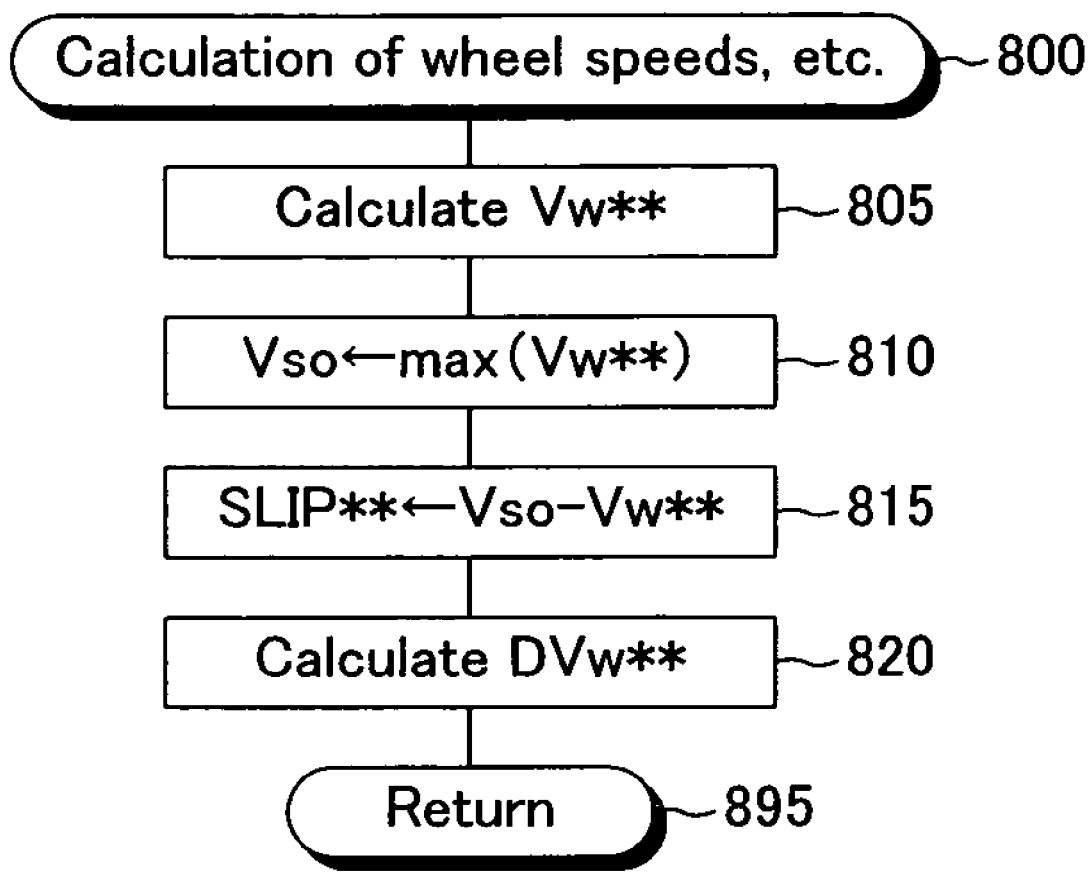
FIG. 8 is a flowchart showing a routine which the CPU shown in FIG. 1 executes in order to calculate wheel speed and other parameters.

At predetermined time intervals, the CPU 51 repeatedly performs a routine shown in FIG. 8 for calculating wheel speed Vw, etc. Accordingly, when a predetermined timing is reached, the CPU 51 starts process of the routine from Step 800, and proceeds to Step 805 so as to calculate the wheel speed Vw of the wheel (the speed of the outer periphery of the wheel). Specifically, the CPU 51 calculates the wheel speed Vw on the basis of the time intervals between pulses of a signal which each wheel speed sensor 41 outputs.

Next, the CPU 51 proceeds to Step 810 and calculates the highest value among the wheel speeds Vw as the estimated vehicle body speed Vso. Alternatively, the average of the wheel speeds Vw may be calculated as the estimated vehicle body speed Vso. Subsequently, the CPU 51 proceeds to Step 815 and calculates the slip amount SLIP of the wheel on the basis of the value of the estimated vehicle body speed Vso calculated in Step 810, the value of the wheel speed Vw** calculated in Step 805, and the equation (1).

Subsequently, the CPU 51 proceeds to Step 820 and calculates the wheel acceleration DVw of the wheel, which is a time-differentiated value of the wheel speed Vw, in accordance with the following equation (3). Subsequently, the CPU 51 proceeds to Step 895 so as to end the present routine. In the equation (3), Vw1 represents the wheel speed Vw** calculated in Step 805 during the previous execution of the present routine, and Δt represents the length of the above-described, predetermined intervals (the computation cycles of the CPU 51).

$$DVw^{}=(Vw^{}-Vw1^{**})/\Delta t \tag{3}$$

Figure 9:
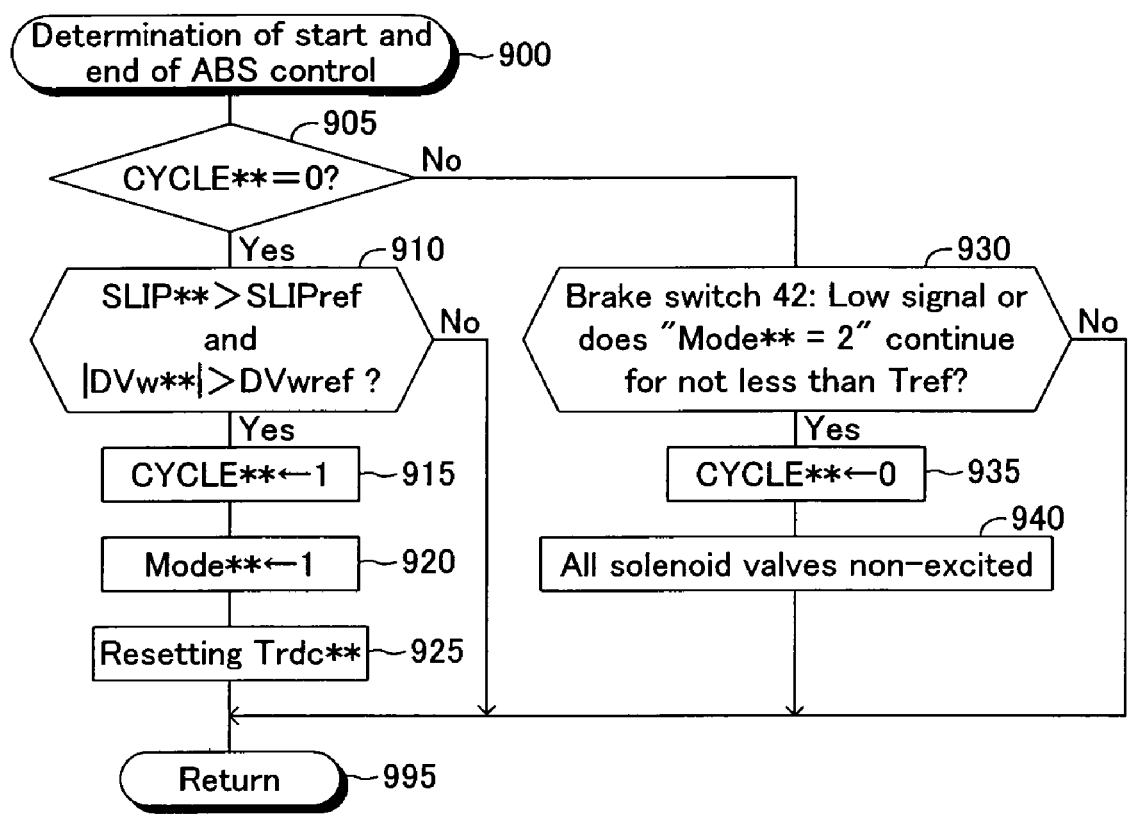
FIG. 9 is a flowchart showing a routine which the CPU shown in FIG. 1 executes in order to perform determination of start and end of ABS control.

Further, the CPU 51 repeatedly performs a routine shown in FIG. 9 for determining start and end of ABS control at predetermined time intervals. Accordingly, when a predetermined timing is reached, the CPU 51 starts process of the routine from Step 900, and proceeds to Step 905 so as to determine whether the value of a variable CYCLE is "0" or not. The variable CYCLE represents that, for the wheel **, the first-time ABS control is not executed when its value is "0", that the second-time ABS control is executed when its value is "2" and that the third-time ABS control is executed when its value is "3".

The description will be continued on the assumption that the ABS control is currently halted, and the ABS control start conditions have not been satisfied. In this case, since the value of the variable CYCLE is "0," the CPU 51 makes a "Yes" determination in Step 905, and then proceeds to Step 910 in order to determine whether the ABS control start conditions are satisfied. Here, the latest value calculated at the previous Step 815 is used as SLIP and the latest value calculated at the previous Step 820 is used as DVw**.

At the present stage, the ABS control start conditions are not satisfied. Therefore, the CPU 51 makes a "NO" determination in Step 910, and immediately proceeds to Step 995 in order to end the present routine. After that, until the ABS control start conditions are satisfied, the CPU 51 repeatedly executes the processes of Steps 900, 905 and Step 910.

Next, the description will be continued on the assumption that the driver operates the brake pedal BP, so that the ABS control start conditions are satisfied for the wheel  in this state (see time t1 in FIG. 5 and time t21 in FIG. 7). In this case, the CPU 51 makes a "Yes" determination when it proceeds to Step 910, and then proceeds to Step 915 in order to change the value of the variable CYCLE to "1" from "0". At the following Step 920, the CPU 51 sets the value of a variable Mode to "1". The variable Mode represents that, for the wheel **, the pressure-reducing control is executed when its value is "1", that the holding control is executed when its value is "2", and that the pressure-increasing control (i.e., "linear pressure-increasing control with holding period" or linear pressure-increasing control) is executed when its value is "3".

Subsequently, the CPU 51 proceeds to Step 925 so as to reset the elapsed time Trdc, and then, proceeds to Step 995 to temporarily end this routine. The elapsed time Trdc represents the elapsed time from the point (i.e., the point of starting the pressure-reducing control, see time t1 in FIG. 5 and time t21 in FIG. 7) of starting the control cycle (the first-time control cycle at the present time) for the wheel  started after the present time, the elapsed time being measured by a predetermined timer installed in the electronic control apparatus 50**.

After that, the CPU 51 makes a "NO" determination when proceeding to Step 905, and then, proceeds to Step 930 in order to monitor whether the ABS control end condition is satisfied. The ABS control end condition is satisfied when the brake switch 42 outputs Low signal (i.e., when the driver finishes the operation on the brake pedal BP) or when the state in which "Mode=2" is established (i.e., the execution of the pressure-increasing control) continues for not less than the predetermined time Tref.

Since the present stage is immediately after the ABS control start conditions are satisfied, the CPU 51 makes a "NO" determination at Step 925. After that, until the ABS control end condition at Step 930 is satisfied, the CPU 51 repeatedly executes the processes of Steps 900, 905 and 930. During the execution of these processes, the CPU 51 executes the ABS control successively from the first-time control cycle for the wheel  by the execution of the routines shown in FIGS. 10 to 12** described later.

Figure 10:
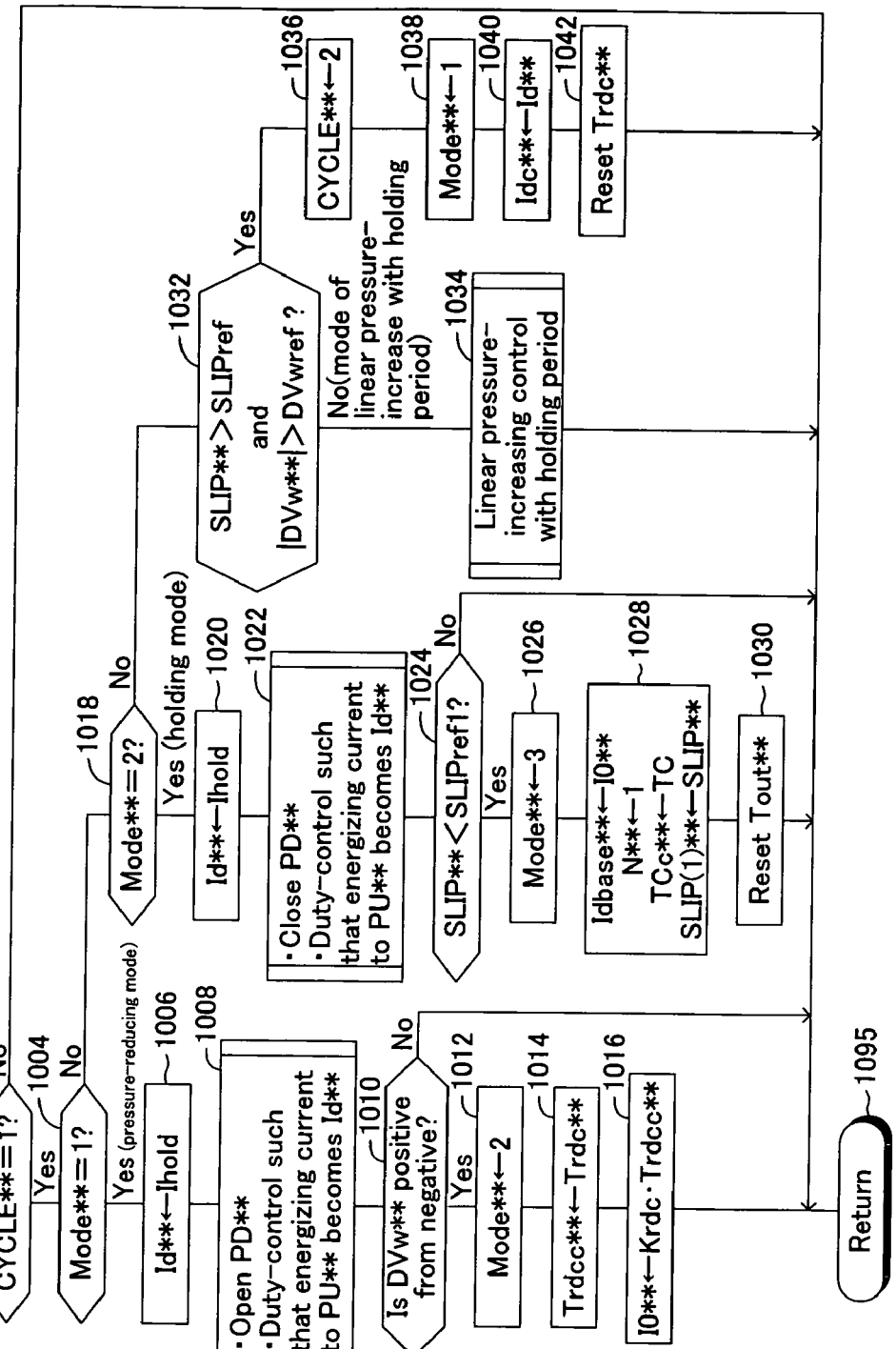
FIG. 10 is a flowchart showing a routine which the CPU shown in FIG. 1 executes in order to execute ABS control according to the first-time control cycle.
Figure 11:
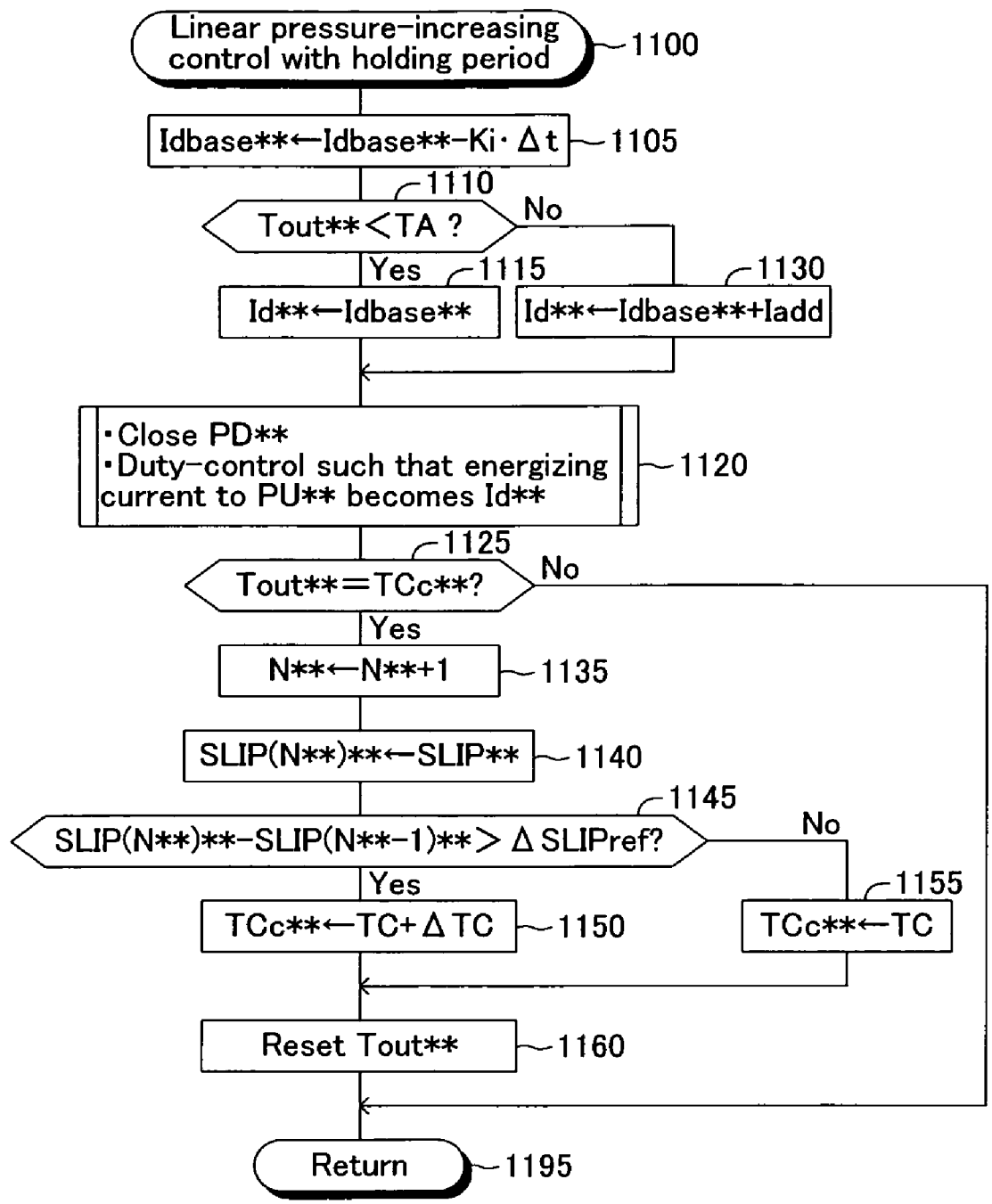
FIG. 11 is a flowchart showing a routine which the CPU shown in FIG. 1 executes in order to execute a linear pressure-increasing control with holding period.

The CPU 51 repeatedly performs a routine shown in FIG. 10 for executing the first-time control cycle at predetermined time intervals. Accordingly, when a predetermined timing is reached, the CPU 51 starts process of the routine from Step 1000, and proceeds to Step 1002 so as to determine whether the value of the variable CYCLE is "1". In case where the CPU 51 makes a "NO" determination, it immediately proceeds to Step 1095** in order to end the present routine.

The description will be continued on the assumption that the preset stage is immediately after the ABS control start conditions are at first satisfied and immediately after the variable CYCLE is changed to "1" from "0" by the execution of the previous Step 915 (see time t1 in FIG. 5 and time t21 in FIG. 7). The CPU 51 makes a "YES" determination at Step 1002 and proceeds to Step 1004 for determining whether the value of the variable Mode is "1".

Since the value of the variable Mode is "1" by the process at the previous Step 920 at the present point, the CPU 51 makes a "YES" determination at Step 1004 and proceeds to Step 1006 to set the command current value Id to the pressure-increasing valve PU for the wheel  to the closed-valve holding current value Ihold. Then, at Step 1008, the CPU 51 brings the pressure-reducing valve PD for the wheel  into its open state and duty-controls the energizing current value to the pressure-increasing valve PU so as to coincide with the command current value Id (=Ihold). Thus, the pressure-reducing control for the wheel  is started and executed.

Subsequently, the CPU 51 proceeds to Step 1010 to determine whether the value of the wheel acceleration DVw for the wheel  is changed from the negative value to the positive value (i.e., whether the value of the wheel speed Vw becomes extremely small value), i.e., whether the holding control start condition is satisfied. The latest value calculated at the previous Step 820 is used as DVw. Since the present point is immediately after the pressure-reducing control is started, the value of the wheel speed Vw does not become the extremely small value. Therefore, the CPU 51 makes a "NO" determination at Step 1010 and immediately proceeds to Step 1095. After that, the CPU 51 repeatedly executes the processes of Steps 1000 to 1010 until the holding control start condition is satisfied for the wheel . As a result, the pressure-reducing control for the wheel ** is continued.

When the value of the wheel speed Vw becomes the extremely small value after elapse of predetermined time (see time t2 in FIG. 5 and time t22 in FIG. 7), the CPU 51 makes a "YES" determination when it proceeds to Step 1010, and then, proceeds to Step 1012 to change the value of the variable Mode from "1" to "2".

Then, the CPU 51 proceeds to Step 1014 to store the elapsed time Trdc (the pressure-reducing control continuation time in the first-time control cycle at the present time) at this point as a control-use elapsed time Trdcc. At the next Step 1016, the CPU 51 calculates the current-value-corresponding-to-reduced-pressure ΔIrdc in accordance with the equation described in Step 1016 and corresponding to the aforesaid equation (2), and stores this value ΔIrdc as the value I0**.

After that, since the value of the variable Mode is "2", the CPU 51 makes a "NO" determination at Step 1004 and proceeds to Step 1018. When proceeding to Step 1018, the CPU 51 determines whether the value of the variable Mode is "2" or not. Since the value of the variable Mode is "2" at the present time, the CPU 51 makes a "YES" determination at Step 1018, and then, proceeds to Step 1020 to set the command current value Id to the pressure-increasing valve PU** to the closed-valve holding current value Ihold.

Then, at Step 1022, the CPU 51 brings the pressure-reducing valve PD into its closed state and duty-controls the energizing current value to the pressure-increasing valve PU so as to coincide with the command current value Id (=Ihold). According to this, the holding control for the wheel ** is started and executed.

Subsequently, the CPU 51 proceeds to Step 1024 in order to determine whether the value of the slip amount SLIP for the wheel  is smaller than the predetermined value SLIPref1, i.e., whether the pressure-increasing control start condition is satisfied. The latest value calculated at the previous Step 815 is used as SLIP**.

Since the present point is immediately after the holding control is started, the value of the slip amount SLIP is greater than SLIPref1. Accordingly, the CPU 51 makes a "NO" determination at Step 1024 and directly proceeds to Step 1095. After that, the CPU 51 repeatedly executes the processes of Steps 1000 to 1004 and the processes of Steps 1018 to 1024 until the pressure-increasing control start condition is satisfied for the wheel . As a result, the holding control for the wheel ** is continued.

When the value of SLIP becomes smaller than the predetermined value SLIPref1 after elapse of predetermined time (see time t3 in FIG. 5 and time t23 in FIG. 7), the CPU 51** makes a "YES" determination when it proceeds to Step 1024, and then, proceeds to Step 1026 to change the value of the variable Mode** from "2" to "3".

Subsequently, in order to prepare for the pressure-increasing control (specifically, the "linear pressure-increasing control with holding period") that is to be executed next, the CPU 51 proceeds to Step 1028 to set the (initial value) of the basic current value Idbase to the value I0 stored in the previous Step 1016, set the value of a variable N to "1", set the variable TCc to the aforesaid cycle TC, and set the value of the SLIP(1) to the latest slip amount SLIP calculated at Step 815. Then, the CPU 51 resets the elapsed time Tout at the following Step 1030**.

Here, the variable N is a value representing the number of times of executing the "cycle control" for the wheel  at the present point, TCc is a value representing a cycle (control-use cycle) of the cycle control that is being executed for the wheel  (control cycle), SLIP(k) (k=1, 2, . . . ) is a slip amount for the wheel  at the point of starting the kth-time "cycle control", and Tout represents the elapsed time, that is counted by a predetermined timer incorporated in the electronic controller 50, from the point of starting the "cycle control" for the wheel ** that is being executed.

Since the value of the variable Mode becomes "3" as the result of this process, the CPU 51 makes a "NO" determination when proceeding to Step 1018, and then, proceeds to Step 1032. When the CPU 51 proceeds to Step 1032, it determines whether the ABS control start conditions same as the previous Step 910** are satisfied (i.e., whether the second-time control cycle is started).

Since the present point is immediately after the "linear pressure-increasing control with holding period" is started, the ABS control start conditions are not satisfied. Therefore, the CPU 51 makes a "NO" determination at Step 1032, and then, proceeds to Step 1034. Then, the CPU 51 starts the process of the routine from Step 1100 for executing the "linear pressure-increasing control with holding period" shown in FIG. 11 via Step 1034.

When the CPU 51 proceeds to Step 1105, it sets the value obtained by subtracting the value "Ki·Δt" from the basic current value Idbase (=I0) at the present time as the new basic current value Idbase, thereby updating the basic current value Idbase. Here, Ki is a coefficient corresponding to the above-mentioned "constant slope" in the basic pattern, and Δt is the computation cycle of the present routine. Specifically, the value "Ki·Δt" is the decreasing amount of the basic current value Idbase per one computation cycle of the present routine in the basic pattern. Accordingly, the basic current value Idbase is set and changed along the basic pattern having the value I0 as the initial value.

Then, the CPU 51 proceeds to Step 1110 so as to determine whether the elapsed time Tout reaches the pressure-increasing time TA. Since the present point is immediately after the process at Step 1030 is executed, the elapsed time Tout does not reach the pressure-increasing time TA. Therefore, the CPU 51 makes a "YES" determination at Step 1110, and then, proceeds to Step 1115 to set the command current value Id to the basic current value Idbase at the present time itself.

Then, at Step 1120, the CPU 51 maintains the pressure-reducing valve PD in its closed state and duty-controls the energizing current value to the pressure-increasing valve PU so as to coincide with the command current value Id (=Idbase). According to this, the first-time "cycle control" (the pressure-increasing control in the first-time "control cycle") for the wheel ** is started and executed.

Subsequently, the CPU 51 proceeds to Step 1125 in order to determine whether the elapsed time Tout reaches the control-use cycle TCc (equals to the cycle TC at the present point). Since the elapsed time Tout does not reach the cycle TC at the present point, the CPU 51 makes a "NO" determination at Step 1125, and directly proceeds to Step 1095 via Step 1195 and Step 1034 in FIG. 10 in order to end the routine shown in FIG. 10**.

After that, so long as the ABS control start conditions are not satisfied, the CPU 51 repeatedly executes the processes at Steps 1000 to 1004, 1018, 1032, 1034 and 1100 to 1125 until the elapsed time Tout agrees with the pressure-increasing time TA. As a result, the first-time "cycle control" (the pressure-increasing control in the first-time "control cycle") for the wheel  is continued.

When the elapsed time Tout agrees with the pressure-increasing time TA, the CPU 51 makes a "NO" determination when proceeding to Step 1110, and proceeds to Step 1130, instead of Step 1115, to set the command current value Id to the value "Idbase+Iadd" obtained by adding the addition value Iadd to the basic current value Idbase at the present point. As a result, the holding control in the first-time "cycle control" for the wheel  is executed and continued by the repeated execution of Step 1120**.

Thereafter, when the elapsed time Tout agrees with the control-use cycle TCc (=TC) (see time t4 in FIG. 5 and time t24 in FIG. 7), the CPU 51 makes a "YES" determination when proceeding to Step 1125, and then, proceeds to Step 1135 to increment the value of the variable N by "1" (it becomes "2" from "1" at the present point). At the successive Step 1140, the CPU 51 sets the value of the variable SLIP (N) (at the present point, the slip amount SLIP(2) at the point of starting the second-time "cycle control") to the latest slip amount SLIP (at the present point) calculated at Step 815**.

Subsequently, the CPU 51 proceeds to Step 1145 in order to determine whether the value ((SLIP(2)−SLIP(1) at the present point) obtained by subtracting the variable SLIP (N−1) from the variable SLIP(N) is greater than the predetermined value ΔSLIPref. In case where the CPU 51 makes a "YES" determination (i.e., in case where the increasing slope of the wheel cylinder hydraulic pressure Pw is extremely great), the CPU 51 proceeds to Step 1150 to set the control-use cycle TCc to the value obtained by adding the extension time ΔTC to the cycle TC. On the other hand, when the CPU 51 makes a "NO" determination, the CPU 51 proceeds to Step 1155 to set the value of the control-use cycle TCc to the cycle TC itself. Then, the CPU 51 proceeds to Step 1160 to reset the elapsed time Tout, and then, proceeds to Step 1095 via Steps 1195 and 1034 in order to end the routine shown in FIG. 10**.

According to this, the first-time "cycle control" is ended and the second-time "cycle control" is started. Specifically, so long as the ABS control start conditions are not satisfied at the second time, the pressure-increasing control is executed by the execution of Steps 1115 and 1120 before the elapsed time Tout reaches the pressure-increasing time TA, and the holding control is executed by the execution of Steps 1130 and 1120 after the elapsed time Tout reaches the pressure-increasing time TA and before the elapsed time Tout reaches the control-use cycle TCc set at Step 1150 or 1155.

When the elapsed time Tout reaches the control-use cycle TCc (see time t5 in FIG. 5 and time t25 in FIG. 7), the second-time "cycle control" is ended and the third-time "cycle control" is started. In this manner, the "cycle control" is continuously and repeatedly executed (i.e., the "linear pressure-increasing control with holding period" is continued) after that so long as the ABS control start conditions are not satisfied at the second time.

When the ABS control start conditions are satisfied at the second time (see time t6 in FIG. 5 and time t26 in FIG. 7), the CPU 51 makes a "YES" determination when proceeding to Step 1032, and then, proceeds to Step 1036 to change the value of the variable CYCLE to "2" from "1". Then, at the successive Step 1038, the CPU 51 changes the value of the variable Mode from "3" to "1".

Then, the CPU 51 proceeds to Step 1040 so as to store the command current value Id at the present point (i.e., at the point of ending the "linear pressure-increasing control with holding period") as the current-value-corresponding-to-actual-differential-pressure Idc at the point of starting the pressure-reducing control. Thereafter, the CPU 51 proceeds to Step 1042 to reset the elapsed time Trdc. In this case, the elapsed time Trdc represents the elapsed time from the point (i.e., the point of starting the pressure-reducing control, see time t6 in FIG. 5 and time t26 in FIG. 7) of starting the control cycle (the second-time control cycle at the present point) for the wheel ** started after the present point.

According to this, the value of the variable CYCLE becomes "2". Therefore, the CPU 51 makes a "NO" determination when proceeding to Step 1002 and directly proceeds to Step 1095 in order to end the routine shown in FIG. 10. As a result, the process at Step 1034** is not executed, so that the routine shown in FIG. 11 (i.e., linear pressure-increasing control with holding period) is not executed. Accordingly, the first-time control cycle is ended.

Figure 12:
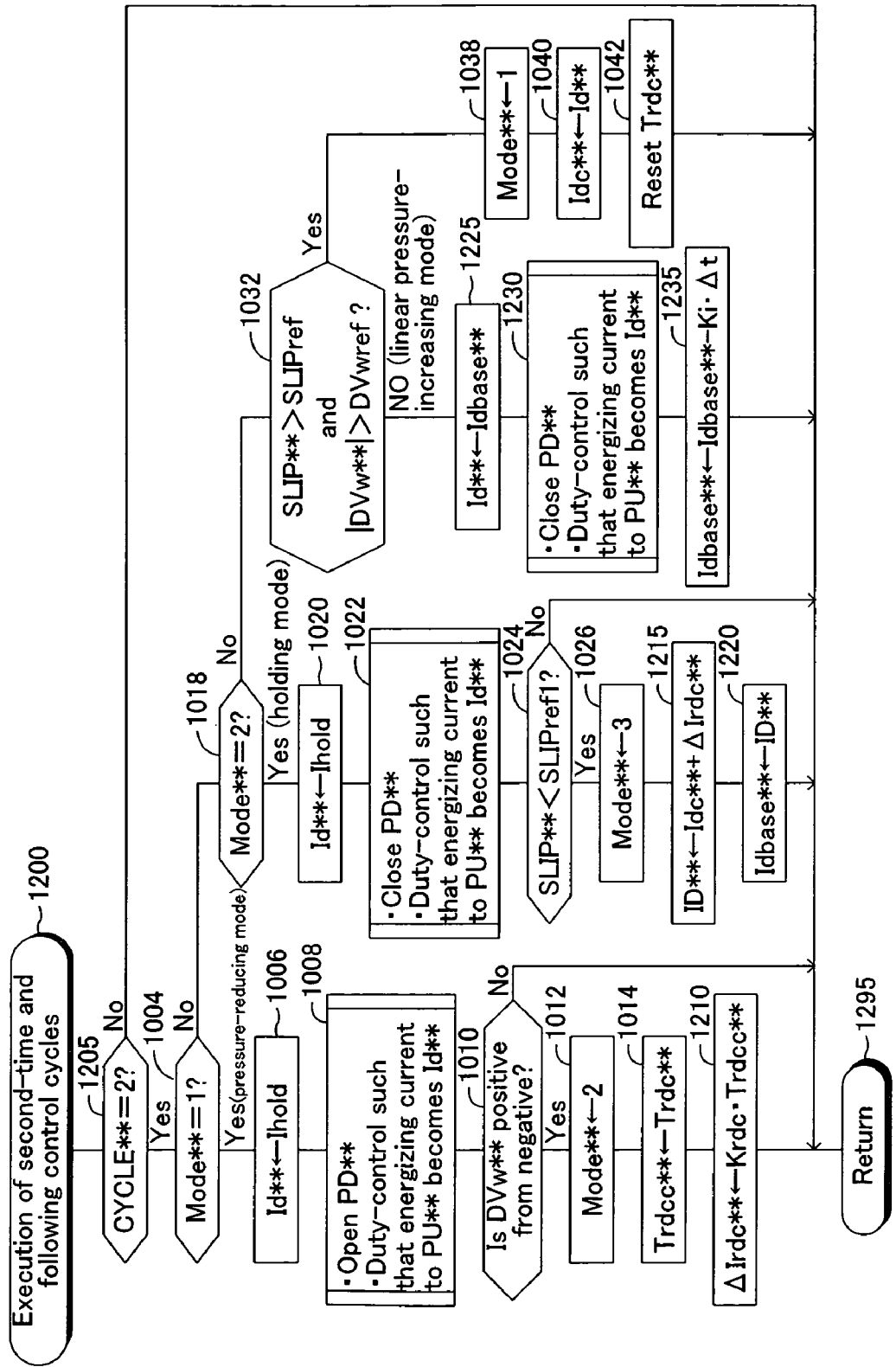
FIG. 12 is a flowchart showing a routine which the CPU shown in FIG. 1 executes in order to execute ABS control according to the second-time and following control cycles.
Figure 13:
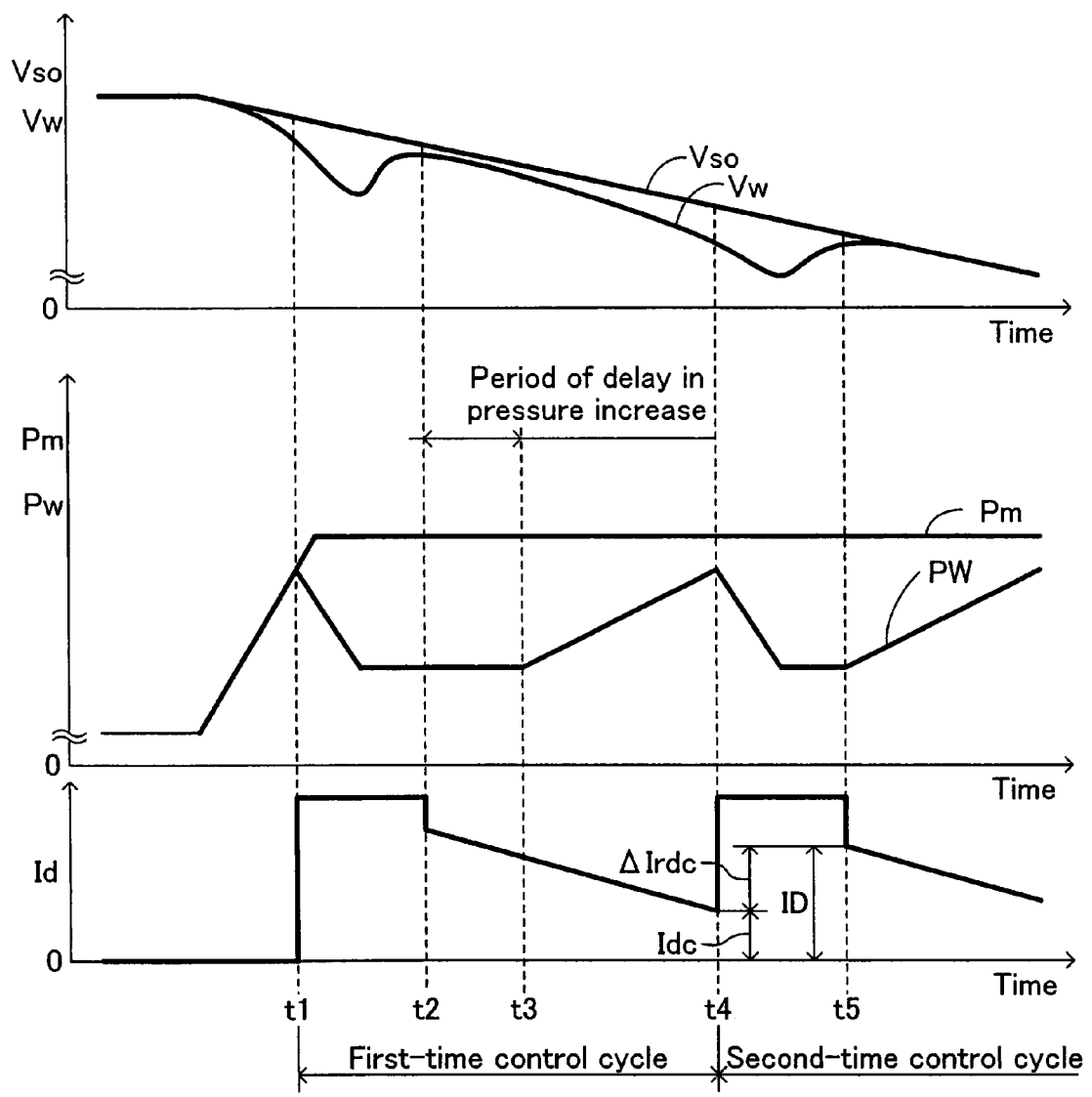
FIG. 13 is a time chart showing one example of a change in estimated vehicle body speed, wheel speed, master cylinder hydraulic pressure, wheel cylinder hydraulic pressure and command current value to the pressure-increasing valve that is the normally-open linear solenoid valve, in case where the ABS control is executed by the brake hydraulic pressure control apparatus according to a prior art since the "slow braking" is applied by a driver.
Figure 14:
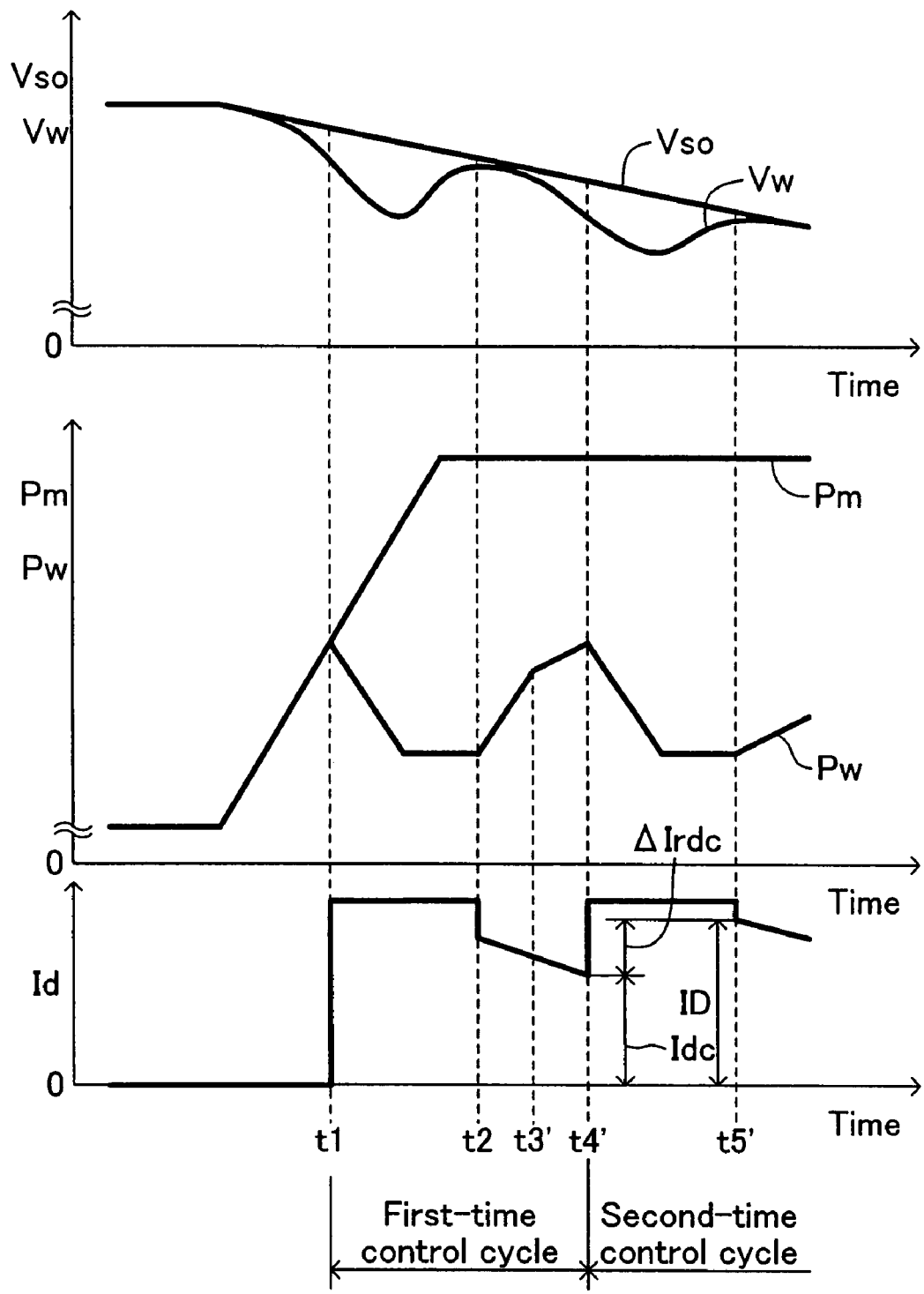
FIG. 14 is a time chart showing one example of a change in estimated vehicle body speed, wheel speed, master cylinder hydraulic pressure, wheel cylinder hydraulic pressure and command current value to the pressure-increasing valve that is the normally-open linear solenoid valve, in case where the ABS control is executed by the brake hydraulic pressure control apparatus according to a prior art since the "sudden braking" is applied by a driver.

On the other hand, the CPU 51 repeatedly performs a routine shown in FIG. 12 executing the second-time and the following control cycles at predetermined time intervals. Note that corresponding Step numbers same as those in FIG. 10 are given to Steps in FIG. 12 executing the same process as that in FIG. 10, thereby omitting the detailed explanation thereof. Therefore, the explanation is made mainly for Steps specific to FIG. 12 hereinafter.

When a predetermined timing is reached, the CPU 51 starts process of the routine from Step 1200, and proceeds to Step 1205 in order to determine whether the value of the variable CYCLE is "2". In case where the CPU 51 makes a "NO" determination, it directly proceeds to Step 1295** to end the present routine.

The description will be continued on the assumption that the present stage is immediately after the second-time ABS control start conditions are satisfied and immediately after the value of the variable CYCLE is changed from "1" to "2" by the execution of the previous Step 1036 (see time t6 in FIG. 5 and time t26 in FIG. 7). The CPU 51 makes a "YES" determination at Step 1205 and proceeds to Step 1004 where a "YES" determination is also made since the value of the variable Mode becomes "1" by the execution of the previous Step 1038.

As a result, like the case of the previous first-time control cycle, the pressure-reducing control for the wheel  is executed until the condition (holding control start condition) at Step 1010 is satisfied (see the period from time t6 to time t7 in FIG. 5 and the period from time t26 to time t27 in FIG. 7). When the holding control start condition is satisfied (see time t7 in FIG. 5 and time t27 in FIG. 7), the CPU 51 makes a "YES" determination at Step 1010, and then, proceeds to Step 1012 to change the value of the variable Mode from "1" to "2".

Subsequently, the CPU 51 proceeds to Step 1014 to set the elapsed time Trdec at the present point (the pressure-reducing control continuation time in the second-time control cycle at the present point) as the control-use elapsed time Trdcc. Then, at Step 1210, the CPU 51 calculates the current-value-corresponding-to-reduced-pressure ΔIrdc in accordance with the equation described in Step 1210 and corresponding to the aforesaid equation (2). After that, the holding control is executed for the wheel  until the condition in Step 1024 (pressure-increasing control start condition) is established (see the period from time t7 to time t8 in FIG. 5, and the period from time t27 to time t28 in FIG. 7).

When the pressure-increasing control start condition is satisfied, the CPU 51 makes a "YES" determination at Step 1024 and proceeds to Step 1026 to change the value of the variable Mode from "2" to "3". Thereafter, the CPU 51 proceeds to Step 1215 to store the sum of the current-value-corresponding-to-reduced-pressure Idc at the point of starting the pressure-reducing control stored at Step 1040 in FIG. 10 and the current-value-corresponding-to-reduced-pressure ΔIrdc calculated at Step 1210 as the value ID. Then, at the following Step 1220, the CPU 51 sets the basic current value Idbase to the stored value ID.

According to this, the basic current value Idbase (=command current value Id) at the point (see time t8 in FIG. 5 and time t28 in FIG. 7) of starting the linear pressure-increasing control in the second-time (and the following) control cycle agrees with the current-value-corresponding-to-actual-differential-pressure at the same point.

Since the value of the variable Mode becomes "3" as a result of this, the CPU 51 proceeds to Step 1032. The CPU 51 makes a "NO" determination at Step 1032 so long as the ABS control start conditions are not again satisfied, and then, proceeds to Step 1225. When proceeding to Step 1225, the CPU 51 sets the command current value Id to the basic current value Idbase (the value ID at the present point) itself, and maintains the pressure-reducing valve PD in its closed state and duty-controls the energizing current value to the pressure-increasing valve PU so as to coincide with the command current value Id (the value ID at the present point) at the next Step 1230.

Then, the CPU proceeds to Step 1235 so as to set the value obtained by subtracting the value "Ki·Δt" from the command current value Id at the present point, thereby updating the basic current value Idbase. Here, "Ki·Δt" is "the decreasing amount of the basic current value Idbase per one computation cycle of the present routine in the basic pattern", like the previous Step 1105. Therefore, the basic current value Idbase is set and changed along the basic pattern having the value ID as the initial value.

The processes at Steps 1225 to 1235 are repeatedly performed until the ABS control start conditions are again satisfied. As a result, the command current value Id(=basic current value Idbase) is gradually decreased and the linear pressure-increasing control for the wheel ** is executed.

When the ABS control start conditions are again satisfied (see time t9 in FIG. 6), the CPU 51 makes a "YES" determination when proceeding to Step 1032, and executes the processes at Steps 1038 to 1042. Accordingly, the variable Mode is again changed from "3" to "1", and the command current value Id at the present point (i.e., at the point of ending the second-time ABS control) is stored as the current-value-corresponding-to-actual-differential-pressure Idc at the point of starting the pressure-reducing control. Further, the elapsed time Trdc is reset.

At this time, the value of the variable CYCLE is maintained to be "2". As a result, the CPU 51 keeps on making a "YES" determination when proceeding to Step 1205**, so that the ABS control in the third-time and the following control cycles are achieved by the execution of the routine shown in FIG. 12, like the case of the second-time control cycle.

As explained above, the operation of the CPU 51 can be executed so long as the ABS control end condition at Step 930 in the routine in FIG. 9 in which the processes at Steps 900, 905 and 930 are repeatedly executed is not satisfied. Accordingly, in case where the condition at Step 930 is satisfied such as the driver stops the operation on the brake pedal BP during the above-mentioned operation, the CPU 51 makes a "YES" determination at Step 930 and proceeds to Step 935 to change the value of the variable CYCLE to "0" from any one of "1" to "3". At the successive Step 940, all the solenoid valves (specifically, pressure-increasing valve PU and pressure-reducing valve PD**) are brought into their non-excited state. This ends the executed series of ABS control.

After that, the CPU 51 makes a "YES" determination when proceeding to Step 905 and again proceeds to Step 910 in order to monitor whether the ABS control start conditions are satisfied.

As explained above, the vehicle brake hydraulic pressure control apparatus according to the embodiment of the present invention employs, as the pressure-increasing valve PU, a normally-open linear solenoid valve in which the energizing current value is linearly controlled by a duty control and employs a normally-closed on-off solenoid valve as the pressure-reducing valve PD. Then, in principle, the present embodiment repeatedly executes the ABS control, in which pressure-reducing control, holding control and pressure-increasing control make one set, after the ABS control start conditions are satisfied and until the ABS control end conditions are satisfied. In this case, the "linear pressure-increasing control with holding period" is executed instead of the linear pressure-increasing control only in the first-time ABS control that is started with a state in which the current-value-corresponding-to-actual-differential-pressure cannot correctly be obtained.

In the "pressure-increasing control with holding period", the command current value Id at the point of starting this control is set to the current-value-corresponding-to-reduced-pressure ΔIrdc that is always smaller than the current-value-corresponding-to-actual-differential-pressure at the same point. As a result, the wheel cylinder hydraulic pressure can be increased immediately after the start of the "linear pressure-increasing control with holding period", so that the occurrence of the aforesaid "delay of the start of pressure increase in the wheel cylinder hydraulic pressure" in case where the "slow braking" is applied can be prevented. In addition, in the "linear pressure-increasing control with holding period", each of the pressure-increasing times TA is set rather short and the holding time TB is provided, so that the occurrence of the aforesaid "rapid increase in the wheel cylinder hydraulic pressure over a relatively long period" when the "sudden braking" is applied can also be prevented.

Moreover, in the "linear pressure-increasing control with holding period", when the value obtained by subtracting the slip amount SLIP(k−1) obtained last time at the point of starting the "cycle control" from the slip amount SIIP(k) obtained this time at the point of starting the "cycle control" is greater than the predetermined value ΔSLIPref, it is determined that the increasing slope of the wheel cylinder hydraulic pressure during the "linear pressure-increasing control with holding period" becomes extremely great, so that the cycle TC (specifically, the holding time TB) during the "cycle control" this time is extended by the extension time ΔTC. Accordingly, in case where increasing slope of the wheel cylinder hydraulic pressure during the "linear pressure-increasing control with holding period" becomes extremely great, the increasing slope can be decreased toward the optimum value, and consequently, the optimum "linear pressure-increasing control with holding period" based upon the optimum increasing slope of the wheel cylinder hydraulic pressure can be executed.

The present invention is not limited to the above-mentioned embodiment, and various modifications may be practiced without departing from the scope of the present invention. For example, in the aforesaid embodiment, the energizing current value (accordingly, the command current value Id) to the pressure-increasing valve PU, that is the normally-open linear solenoid valve, is set and changed to the value "Idbase+Iadd" for the "current value for maintaining the pressure-increasing valve PU in its closed state" during the execution of the holding control (i.e., during the holding time TB) in the "linear pressure-increasing control with holding period". However, the current energizing value described above may be maintained to be the closed-valve holding current value Ihold (see FIG. 3, constant value).

Although in the aforesaid embodiment, the command current value Id to the pressure-increasing valve PU** at the point of starting the "linear pressure-increasing control with holding period" is set to the aforesaid "current-value-corresponding-to-reduced-pressure ΔIrdc", it may be set to the other value (e.g., constant value), so long as it is smaller than the current-value-corresponding-to-actual-differential-pressure at the point of starting the "linear pressure-increasing control with holding period" even if the "slow braking" is applied.

In addition, in the above embodiment, the cycle TC in the "cycle control" obtained this time is prolonged by the extension time ΔTC only when the value obtained by subtracting the slip amount SLIP(k−1) at the point of starting the "cycle control" obtained last time from the slip amount SLIP(k) at the time of starting the "cycle control" obtained this time is greater than the predetermined value ΔSLIPref. However, the extension time ΔTC of the cycle TC in this-time "cycle control" may be changed according to the value obtained by subtracting SLIP(k−1) from SLIP(k).

What is claimed is:

1. A brake hydraulic pressure control apparatus that is applied to a control unit provided with:

a pressure-increasing valve disposed in a first hydraulic circuit between a master cylinder generating a master cylinder hydraulic pressure and a wheel cylinder, and adjusting a differential pressure between the master cylinder hydraulic pressure and a wheel cylinder hydraulic pressure in the wheel cylinder proportionally in accordance with a first energizing current value provided to the pressure-increasing valve; and a pressure-reducing valve disposed in a second hydraulic circuit between the wheel cylinder and a reservoir and being opened and closed in accordance with a second energizing current value provided to the pressure-reducing valve, comprising:

anti-skid control means for continuously executing, plural times, an anti-skid control that is started in response to an establishment of a predetermined anti-skid control start condition, and in which anti-skid control, a pressure-reducing control for reducing the wheel cylinder hydraulic pressure is executed by controlling the first energizing current value and the second energizing current value and then a linear pressure-increasing control for increasing the wheel cylinder hydraulic pressure linearly continues to be executed by changing the first energizing current value with a basic pattern, in which pattern the first energizing current value linearly changes with a constant negative slope while the pressure-reducing valve is maintained in its closed state through controlling the second energizing current value until the next anti-skid control start condition is established, wherein the anti-skid control means is configured to set the first energizing current value to values, instead of the values corresponding to the basic pattern, for maintaining the pressure-increasing valve in its closed state over a predetermined period which is a part of a period from a starting point to an ending point of the linear pressure-increasing control in a predetermined-numberth-time anti-skid control, thereby executing a holding control for holding the wheel cylinder hydraulic pressure over the predetermined period.

2. A vehicle brake hydraulic pressure control apparatus according to claim 1, wherein the holding control is executed during the linear pressure-increasing control in the anti-skid control of a first time of the plural times.

3. A vehicle brake hydraulic pressure control apparatus according to claim 1, wherein the anti-skid control means is configured to set the first energizing current value at a point of starting the linear pressure-increasing control in the predetermined-numberth-time anti-skid control to a value corresponding to an increase amount of the differential pressure by a decrease in the wheel cylinder hydraulic pressure due to the pressure-reducing control in the predetermined-numberth-time anti-skid control.

4. A vehicle brake hydraulic pressure control apparatus according to claim 1, wherein the anti-skid control means is configured to set the first energizing current value during the execution of the pressure-reducing control in the predetermined-numberth-time anti-skid control to predetermined values (Ihold) for maintaining the pressure-increasing valve in its closed state and to set the first energizing current value during the execution of the holding control in the linear pressure-increasing control in the predetermined-numberth-time anti-skid control to values (ibase+Iadd) obtained by adding the fixed value to the values corresponding to the basic pattern are smaller than the predetermined values (Ihold) during the execution of the pressure-reducing control.

5. A vehicle brake hydraulic pressure control apparatus according to claim 1, wherein the anti-skid control means is configured to periodically execute the holding control during the linear pressure-increasing control in the predetermined-numberth-time anti-skid control.

6. A vehicle brake hydraulic pressure control apparatus according to claim 5, further comprising:

holding control time changing means that obtains, during the linear pressure-increasing control in the predetermined-numberth-time anti-skid control, a value indicating a degree of an increase in a slip amount for a wheel to which the anti-skid control is to be performed, and changes, in accordance with the value indicating the degree of the increase in the slip amount for the wheel, a length of the predetermined period in which the holding control is executed.

7. A vehicle brake hydraulic pressure control apparatus according to claim 1, wherein the pressure increasing valve is a normally open linear solenoid valve having a relationship between a first energizing current value provided to the pressure increasing valve and a command value of a differential pressure between the master cylinder hydraulic pressure and a wheel cylinder hydraulic pressure in the wheel cylinder, the pressure increasing valve being closed to break a communication between the master cylinder and the wheel cylinder when the command value of the differential pressure is greater than an actual value of the differential pressure and being opened to establish communication between the master cylinder and the wheel cylinder when the command value of the differential pressure is smaller than the actual value of the differential pressure.

8. A brake hydraulic pressure control apparatus, comprising:

anti-skid control means for continuously executing, plural times, an anti-skid control that is started in response to an establishment of a predetermined anti-skid control start condition, and in which anti-skid control, a pressure-reducing control is executed and then a linear pressure-increasing control is executed, the pressure-reducing control for reducing a wheel cylinder hydraulic pressure being executed by controlling a first valve in the form of a linear solenoid valve disposed in a first hydraulic circuit between a master cylinder and a wheel cylinder and a second valve disposed in a second hydraulic circuit between the wheel cylinder and a reservoir, the first valve adjusting a differential pressure between the master cylinder and the wheel cylinder proportionally, and the linear pressure-increasing control for increasing the wheel cylinder hydraulic pressure being continuously executed by controlling the first valve with an energizing current value that linearly changes with a constant negative slope so that the wheel cylinder hydraulic pressure is linearly increased with a constant slope while the second valve is maintained in its closed state until the next anti-skid control start condition is established, wherein the anti-skid control means controls the first valve to be maintained in its closed state over a predetermined period which is a part of a period from a starting point to an ending point of the linear pressure-increasing control in a predetermined-numberth-time anti-skid control, thereby executing a holding control for holding the wheel cylinder hydraulic pressure over the predetermined period.

9. A vehicle brake hydraulic pressure control apparatus according to claim 8, wherein the holding control is executed during the linear pressure-increasing control in the anti-skid control of a first time of the plural times.

10. A vehicle brake hydraulic pressure control apparatus according to claim 8, wherein first valve is a normally open linear solenoid valve having a relationship between a first energizing current value provided to the first valve and a command value of a differential pressure between the master cylinder hydraulic pressure and a wheel cylinder hydraulic pressure in the wheel cylinder, the first valve being closed to break a communication between the master cylinder and the wheel cylinder when the command value of the differential pressure is greater than an actual value of the differential pressure and being opened to establish communication between the master cylinder and the wheel cylinder when the command value of the differential pressure is smaller than the actual value of the differential pressure, the first valve adjusting the differential pressure proportionally in accordance with the first energizing current value provided to the first valve.

* * * * *